United States Patent
Deshpande

(10) Patent No.: US 10,104,390 B2
(45) Date of Patent: *Oct. 16, 2018

(54) MARKING PICTURES FOR INTER-LAYER PREDICTION

(71) Applicant: Sharp Kabushiki Kaisha, Osaka-shi, Osaka (JP)

(72) Inventor: Sachin G. Deshpande, Camas, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 45 days.

This patent is subject to a terminal disclaimer.

(21) Appl. No.: 15/062,312

(22) Filed: Mar. 7, 2016

(65) Prior Publication Data

US 2016/0191938 A1    Jun. 30, 2016

Related U.S. Application Data

(63) Continuation of application No. 13/857,986, filed on Apr. 5, 2013, now Pat. No. 9,351,009.

(51) Int. Cl.
*H04N 19/503* (2014.01)
*H04N 19/44* (2014.01)
(Continued)

(52) U.S. Cl.
CPC ........... *H04N 19/503* (2014.11); *H04N 19/31* (2014.11); *H04N 19/44* (2014.11); *H04N 19/46* (2014.11); *H04N 19/597* (2014.11); *H04N 19/70* (2014.11)

(58) Field of Classification Search
CPC ........ H04N 19/31; H04N 19/44; H04N 19/46; H04N 19/503; H04N 19/597; H04N 19/70
See application file for complete search history.

(56) References Cited

U.S. PATENT DOCUMENTS

2014/0219346 A1* 8/2014 Ugur ................ H04N 19/00575
375/240.12
2014/0254681 A1* 9/2014 Aminlou .............. H04N 19/105
375/240.16

OTHER PUBLICATIONS

Benjamin Bross,High efficiency video coding (HEVC) text specification draft 8, Jul. 20, 2012.*

(Continued)

*Primary Examiner* — Md N Haque
(74) *Attorney, Agent, or Firm* — Keating & Bennett, LLP

(57) ABSTRACT

A method for video coding is described. Signaling of a maximum number of sub-layers for inter-layer prediction is obtained. A sub-layer non-reference picture is also obtained. It is determined whether a value of a temporal identifier of the sub-layer non-reference picture is greater than the maximum number of sub-layers for inter-layer prediction minus 1. The sub-layer non-reference picture is marked as "unused for reference" if the value of the temporal identifier of the sub-layer non-reference picture is greater than the maximum number of sub-layers for inter-layer prediction minus 1. In some cases a sub-layer non-reference picture is also obtained. It is determined whether a value of a temporal identifier of the sub-layer non-reference picture is greater than the maximum number of sub-layers for inter-layer prediction. The sub-layer non-reference picture is marked as "unused for reference" if the value of the temporal identifier of the sub-layer non-reference picture is greater than the maximum number of sub-layers for inter-layer prediction.

2 Claims, 10 Drawing Sheets

(51) Int. Cl.
*H04N 19/70* (2014.01)
*H04N 19/46* (2014.01)
*H04N 19/31* (2014.01)
*H04N 19/597* (2014.01)

(56) References Cited

OTHER PUBLICATIONS

Deshpande, "Marking Pictures for Inter-Layer Prediction", U.S. Appl. No. 13/857,986, filed Apr. 5, 2013.

\* cited by examiner

MARKING PICTURES FOR INTER-LAYER PREDICTION

TECHNICAL FIELD

The present disclosure relates generally to electronic devices. More specifically, the present disclosure relates to systems and methods for marking pictures for inter-layer prediction.

BACKGROUND

Electronic devices have become smaller and more powerful in order to meet consumer needs and to improve portability and convenience. Consumers have become dependent upon electronic devices and have come to expect increased functionality. Some examples of electronic devices include desktop computers, laptop computers, cellular phones, smart phones, media players, integrated circuits, etc.

Some electronic devices are used for processing and displaying digital media. For example, portable electronic devices now allow for digital media to be consumed at almost any location where a consumer may be. Furthermore, some electronic devices may provide download or streaming of digital media content for the use and enjoyment of a consumer.

The increasing popularity of digital media has presented several problems. For example, efficiently representing high-quality digital media for storage, transmittal and playback presents several challenges. As can be observed from this discussion, systems and methods that represent digital media more efficiently may be beneficial.

DETAILED DESCRIPTION

Figure 1:
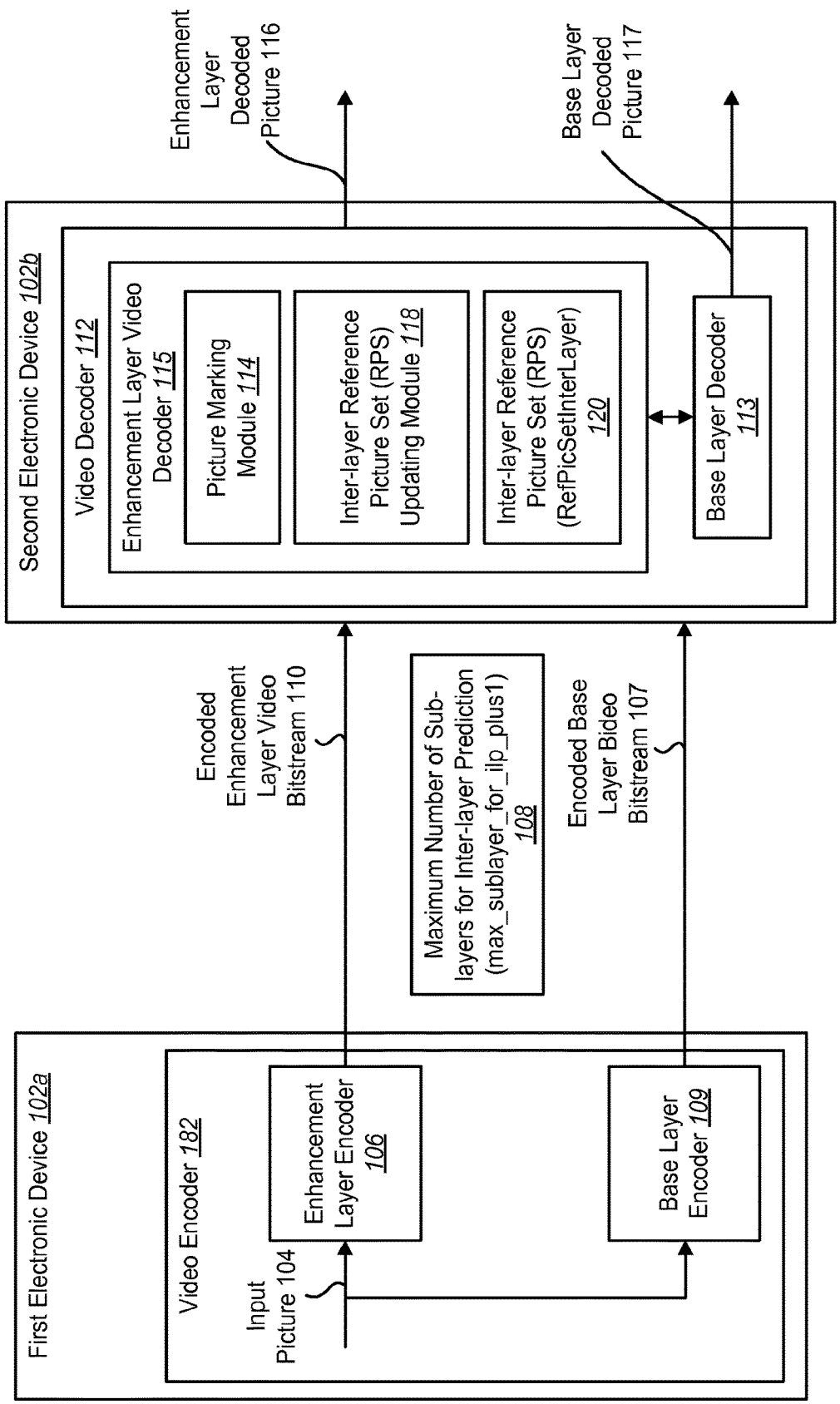
FIG. 1 is a block diagram illustrating video coding between multiple electronic devices.

A method for video coding is described. Signaling of a maximum number of sub-layers for inter-layer prediction is obtained. A sub-layer non-reference picture is also obtained. It is determined whether a value of a temporal identifier of the sub-layer non-reference picture is greater than the maximum number of sub-layers for inter-layer prediction minus 1. The sub-layer non-reference picture is marked as "unused for reference" if the value of the temporal identifier of the sub-layer non-reference picture is greater than the maximum number of sub-layers for inter-layer prediction minus 1.

Marking the sub-layer non-reference picture as "unused for reference" may be performed even if the sub-layer non-reference picture belongs to a layer which is used as a reference layer by any layer in the target layer identifier list. Marking the sub-layer non-reference picture as "unused for reference" may only be performed when a temporal identifier of the sub-layer non-reference picture is equal to a highest temporal identifier present in a bitstream. The maximum number of sub-layers for inter-layer prediction may have an index of [i] or an index of [LayderIdInVps[TargetDecLayerIdList[i]].

A layer identifier of the sub-layer non-reference picture marked may be equal to a target identifier layer. The maximum number of sub-layers for inter-layer prediction may be received via a bitstream. The method may be performed by a decoder within an electronic device. The decoder may conform to a high efficiency video coding (HEVC) standard. In one configuration, the decoder may conform to a scalable high efficiency video coding (SHVC) standard or a Multi-View high efficiency video coding (MV-HEVC) standard.

An electronic device configured for video coding is also described. The electronic device includes a processor and memory in electronic communication with the processor. Instructions stored in the memory are executable to obtain signaling of a maximum number of sub-layers for inter-layer prediction. Instructions stored in the memory are also executable to obtain a sub-layer non-reference picture. Instructions stored in the memory are further executable to determine whether a value of a temporal identifier of the sub-layer non-reference picture is greater than the maximum number of sub-layers for inter-layer prediction minus 1. Instructions stored in the memory are also executable to mark the sub-layer non-reference picture as "unused for reference" if the value of the temporal identifier of the sub-layer non-reference picture is greater than the maximum number of sub-layers for inter-layer prediction minus 1.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating video coding between multiple electronic devices 102*a-b*. A first electronic device 102*a* and a second electronic device 102*b* are illustrated. However, it should be noted that one or more of the features and functionality described in relation to the first electronic device 102*a* and the second electronic device 102*b* may be combined into a single electronic device 102 in some configurations. Each electronic device 102 may be configured to encode video and/or decode video. In one configuration, each of the electronic devices may conform to the High Efficiency Video Coding (HEVC) standard. The HEVC standard is a video compression standard that acts as a successor to H.264/MPEG-4 AVC (Advanced Video Coding) and that provides improved video quality and increased data compression ratios. An electronic device 102 that conforms to the HEVC standard may include additional picture marking capabilities, inter-layer reference picture set (RPS) (RefPicSetInterLayer) 120 updating capabilities and reference picture lists construction capabilities. As used herein, a picture is an array of luma samples in monochrome format or an array of luma samples and two corresponding arrays of chroma samples in 4:2:0, 4:2:2 and 4:4:4 colour format.

The first electronic device 102a may include a video encoder 182 that includes an enhancement layer encoder 106 and a base layer encoder 109. The enhancement layer encoder 106 and the base layer encoder 109 are discussed in additional detail below in relation to FIG. 7. Each of the elements included within the first electronic device 102a (i.e., the enhancement layer encoder 106 and the base layer encoder 109) may be implemented in hardware, software or a combination of both. The first electronic device 102a may obtain an input picture 104. In some configurations, the input picture 104 may be captured on the first electronic device 102a using an image sensor, retrieved from memory or received from another electronic device 102. In one configuration, the video encoder 182 may conform to the scalable high efficiency video (SHVC) standard or the Multi-View high efficiency video coding (MV-HEVC) standard.

The enhancement layer encoder 106 may encode the input picture 104 to produce encoded data. For example, the enhancement layer encoder 106 may encode a series of input pictures 104 (e.g., video). In one configuration, the enhancement layer encoder 106 may be a high efficiency video coding (HEVC) encoder. In another configuration, the enhancement layer encoder 106 may be a scalable high efficiency video (SHVC) encoder or a Multi-View high efficiency video coding (MV-HEVC) encoder. The encoded data may be included in an encoded enhancement layer video bitstream 110. The enhancement layer encoder 106 may generate overhead signaling based on the input picture 104.

The base layer encoder 109 may also encode the input picture 104. In one configuration, the same input picture 104 used by the enhancement layer encoder 106 may also be used by the base layer encoder 109. In another configuration, a different (but similar) input picture than the input picture 104 used by the enhancement layer encoder 106 may be used by the base layer encoder 109. For example, for signal-to-noise ratio (SNR) scalability (also referred to as quality scalability), the same input picture 104 may be used by both the enhancement layer encoder 106 and the base layer encoder 109. As another example, for spatial scalability, a downsampled picture may be used by the base layer encoder 109. In yet another example, for multi-view scalability, a different view picture may be used by the base layer encoder 109. The base layer encoder 109 may produce encoded data included in an encoded base layer video bitstream 107. The base layer encoder 109 may also be a scalable high efficiency video (SHVC) encoder or a Multi-View high efficiency video coding (MV-HEVC) encoder.

The encoded enhancement layer video bitstream 110 and the encoded base layer video bitstream 107 may each include encoded data based on the input picture 104. In one example, the encoded enhancement layer video bitstream 110 and the encoded base layer video bitstream 107 may include encoded picture data. In some configurations, the encoded enhancement layer video bitstream 110 and/or the encoded base layer video bitstream 107 may also include overhead data, such as sequence parameter set (SPS) information, picture parameter set (PPS) information, video parameter set (VPS) information, slice header information, etc.

The first electronic device 102a may provide a maximum number of sub-layers for inter-layer prediction (max_sublayer_for_ilp_plus1) 108 to the second base station 102b. The maximum number of sub-layers for inter-layer prediction (max_sublayer_for_ilp_plus1) 108 may be signaled in VPS extension syntax structure (i.e., using the video parameter set raw byte sequence payload (RBSP) semantics defined in Section F.7.4.3.1 of JCTVC-L1008).

The maximum number of sub-layers for inter-layer prediction (max_sublayer_for_ilp_plus1) 108 may be signaled on the encoded base layer video bitstream 107 or the encoded enhancement layer video bitstream 110. In one configuration, the maximum number of sub-layers for inter-layer prediction (max_sublayer_for_ilp_plus1) 108 may be provided to the second electronic device 102b in overhead data, such as sequence parameter set (SPS) information, picture parameter set (PPS) information, video parameter set (VPS) information, slice header information, etc. In another configuration, the maximum number of sub-layers for inter-layer prediction (max_sublayer_for_ilp_plus1) 108 may be provided to the second electronic device 102b in a separate "metadata" bitstream or file.

The maximum number of sub-layers for inter-layer prediction (max_sublayer_for_ilp_plus1) 108 may be used by the second electronic device 102b to determine whether to mark a picture as "unused for reference." The maximum number of sub-layers for inter-layer prediction (max_sublayer_for_ilp_plus1) 108 may also be used by the second electronic device 102b to add a picture to an inter-layer reference picture set (RPS) (RefPicSetInterLayer) 120. RefPicSetInterLayer may refer to a list of inter-layer reference pictures. The maximum number of sub-layers for inter-layer prediction (max_sublayer_for_ilp_plus1) 108 may further be used by the second electronic device 102b to construct reference picture lists (RefPicList0, RefPicList1).

The encoded enhancement layer video bitstream 110 may be provided to the second electronic device 102b. Likewise, the encoded base layer video bitstream 107 may be provided to the second electronic device 102b. The second electronic device 102b may include a video decoder 112 and a base layer decoder 113. The video decoder 112 may include an enhancement layer decoder 115. In one configuration, the encoded base layer video bitstream 107 is decoded by the base layer decoder 113 while the encoded enhancement layer video bitstream 110 is decoded by the enhancement layer decoder 115. The base layer decoder 113 and the enhancement layer decoder 115 are discussed in additional detail below in relation to FIG. 8. In one configuration, the video decoder 112 may conform to a scalable high efficiency video coding (SHVC) standard. In another configuration, the video decoder 112 may conform to a Multi-View high efficiency video coding (MV-HEVC) standard. The base layer decoder 113 and the enhancement layer decoder 115 may each be high efficiency video coding (HEVC) decoders. The base layer decoder 114 and the enhancement layer decoder 115 may also be scalable high efficiency video coding (SHVC) decoders or Multi-View high efficiency video coding (MV-HEVC) decoders.

In one example, the encoded enhancement layer video bitstream 110 and the encoded base layer video bitstream 107 may be transmitted to the second electronic device 102b using a wired or wireless link. In some cases, this may be done over a network, such as the Internet, a Local Area Network (LAN) or other type of network for communicating between devices. It should be noted that in some configurations, the encoders (i.e., the enhancement layer encoder 106 and the base layer encoder 109) and the decoder 112

(e.g., the video decoder 112, the base layer decoder 113 and the enhancement layer decoder 115) may be implemented on the same electronic device 102 (i.e., the first electronic device 102a and the second electronic device 102b may be part of a single electronic device 102). In an implementation where the encoders and decoders are implemented on the same electronic device 102, for instance, the encoded enhancement layer video bitstream 110 and the encoded base layer video bitstream 107 may be made available to the video decoder 112 in a variety of ways. For example, the encoded enhancement layer video bitstream 110 and the encoded base layer video bitstream 107 may be provided over a bus to the video decoder 112 or stored in memory for retrieval by the video decoder 112.

The video decoder 112 (e.g., the base layer decoder 113 and the enhancement layer decoder 115) may be implemented in hardware, software or a combination of both. In one configuration, the video decoder 112 may be an HEVC decoder. The video decoder 112 may obtain (e.g., receive) the encoded enhancement layer video bitstream 110 and the encoded base layer video bitstream 107. The video decoder 112 may then generate one or more decoded pictures 116 based on the encoded enhancement layer video bitstream 110 and the encoded base layer video bitstream 107. A decoded picture 116 may be displayed, played back, stored in memory and/or transmitted to another device, etc.

The video decoder 112 may include a picture marking module 114. The picture marking module 114 may mark some pictures as "unused for reference." A picture marked as "unused for reference" will not be used as a reference picture for inter or inter-layer prediction. One advantage of marking additional pictures as "unused for reference" is that the decoded picture buffer (DPB) size/memory may be reduced. The picture marking module 114 is discussed in additional detail below in relation to FIGS. 2-4.

The video decoder 112 may also include an inter-layer reference picture set (RPS) updating module 118. The inter-layer reference picture set (RPS) updating module 118 may be used by the video decoder 112 to update an inter-layer reference picture set (RPS) (RefPicSetInterLayer) 120. For example, the inter-layer reference picture set (RPS) updating module 118 may utilize the signaling of the maximum number of sub-layers for inter-layer prediction (max_sublayer_for_ilp_plus1) 108 to determine whether an inter-layer picture is added to the inter-layer reference picture set (RPS) (RefPicSetInterLayer) 120. The inter-layer reference picture set (RPS) updating module 118 is discussed in additional detail below in relation to FIGS. 5-6.

In some configurations, the second electronic device 102b may output a decoded picture 116. In one example, the decoded picture 116 may be transmitted to another device or back to the first electronic device 102a. The decoded picture 116 may also be stored or otherwise maintained on the second electronic device 102b. In another example, the second electronic device 102b may display the decoded picture 116. In other configurations, the decoded picture 116 may include elements of the input picture 104 with different properties based on the encoding and other operations performed on the bitstream 110. In some configurations, the decoded picture 116 may be included in a picture stream with a different resolution, format, specifications or other attribute from the input picture 104.

The bitstream 110 may be relayed from the first electronic device 102a to the second electronic device 102b through an intervening device (not shown). For example, the intervening device may receive the bitstream 110 from the first electronic device 102a and relay the bitstream 110 to the second electronic device 102b.

It should also be noted that one or more of the elements or parts thereof included in the electronic device(s) 102 may be implemented in hardware. For example, one or more of these elements or parts thereof may be implemented as a chip, circuitry or hardware components, etc. The functions or methods described herein may be implemented in and/or performed using hardware. For example, one or more of the methods described herein may be implemented in and/or realized using a chipset, an application specific integrated circuit (ASIC), a large-scale integrated circuit (LSI) or integrated circuit, etc.

Figure 2:
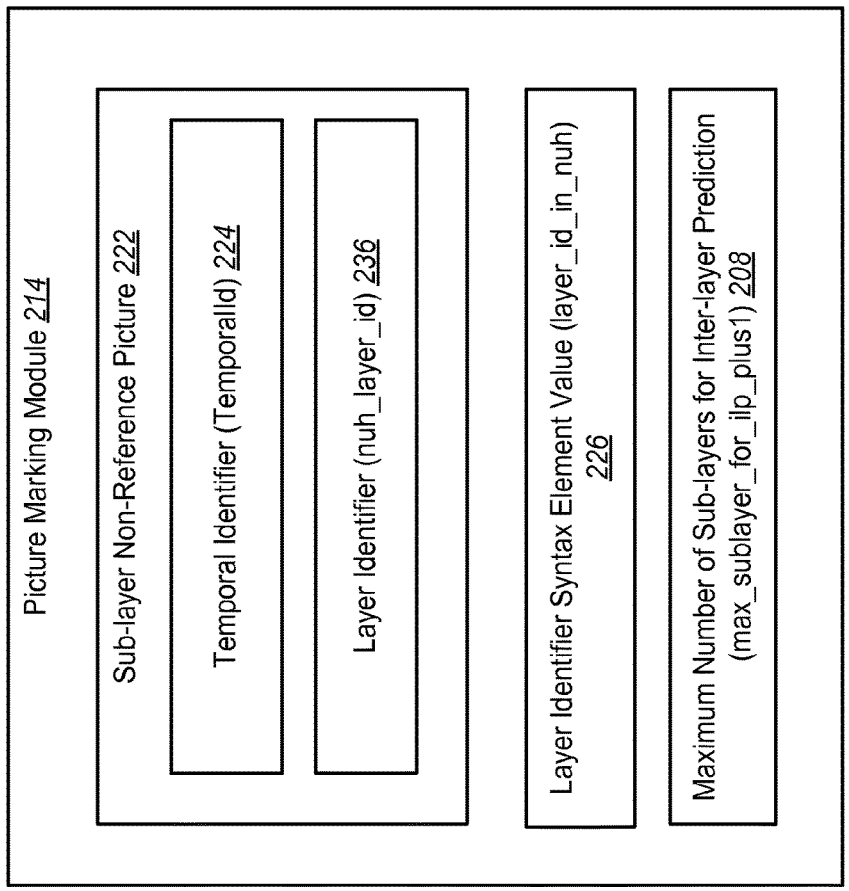
FIG. 2 is a block diagram of a picture marking module for use in the present systems and methods.

FIG. 2 is a block diagram of a picture marking module 214 for use in the present systems and methods. The picture marking module 214 of FIG. 2 may be one configuration of the picture marking module 114 of FIG. 1. The picture marking module 214 may be part of a video decoder 112 on an electronic device 102.

The picture marking module 214 may include a sub-layer non-reference picture 222. As used herein, a temporal subset of a scalable layer is not referred to as a layer but as a sub-layer or temporal sub-layer. A sub-layer is a temporal scalable layer of a temporal scalable bitstream, which includes video coding layer (VCL) network abstraction layer (NAL) units with a particular value of the temporal identifier and the associated non-VCL NAL units. A sub-layer non-reference picture 222 is a picture that includes samples that cannot be used for inter prediction in the decoding process of subsequent pictures of the same sub-layer in decoding order. Samples of a sub-layer non-reference picture 222 may be used for inter prediction in the decoding process of subsequent pictures of higher sub-layers in decoding order.

The sub-layer non-reference picture 222 may be received from the first electronic device 102a via the bitstream 110. Each sub-layer non-reference picture 222 may include a temporal identifier (TemporalId) 224. The picture marking module 214 may also include a maximum number of sub-layers for inter-layer prediction (max_sublayer_for_ilp_plus1) 208. In some cases, the maximum number of sub-layers for inter-layer prediction 208 may be equal to max_sublayer_for_ilp_plus1−1 instead of being equal to max_sublayer_for_ilp_plus1. Also, various syntax elements and their semantics may be altered by including a plus1 or plus2 (for adding) or by including a minus1 or a minus2 (for subtracting) compared to the described syntax and semantics in this document. One value of the maximum number of sub-layers for inter-layer prediction (max_sublayer_for_ilp_plus1) 208 may be sent for each layer. Thus, max_sublayer_for_ilp_plus1 [i] goes from 0 to vps_max_layers_minus1. JCTVC_L0449 defines the syntax and semantics for signaling the use of sub-layer and random access point (RAP) pictures 214 of various layers for inter-layer prediction given in Table 1:

TABLE 1

| vps_extension( ) { | Descriptor |
|---|---|
| ... | |
|   for( i = 1; i<= vps_max_layers_minus1; i++ ) { | |
|     // layer dependency | |
|     for( j = 0; j <i; j++ ) | |
|       direct_dependency_flag[ i ][ j ] | u(1) |
|   } | |
|   for( i = 0; i<= vps_max_layers_minus1; i++ ) { | |
|     max_sublayer_for_ilp_plus1[ i ] | u(3) |
|   } | |
| } | |

As used herein, random access refers to the act of starting the decoding process for a bitstream at a point other than the beginning of the stream. Such a decoding could be typically started at a random access point (RAP) picture. A non-RAP picture refers to a picture that is not a random access point (RAP) picture. In some cases, an RAP picture may instead be referred to as an intra random access point picture (IRAP). Similarly, a non-RAP picture may then be referred to as a non-IRAP picture. A max_sublayer_for_ilp_plus1[i] equal to 0 indicates that non-RAP pictures with a layer identifier (nuh_layer_id) 236 equal to the layer identifier syntax element value layer_id_in_nuh[i] 226 are not used as references for inter-layer prediction. A max_sublayer_for_ilp_plus1[i] greater than 0 indicates that pictures with layer identifiers (nuh_layer_id) 236 equal to the layer identifier syntax element value (layer_id_in_nuh[i]) 226 and with a temporal identifier (TemporalId) 224 greater than max_sublayer_for_ilp_plus1[i]-1 are not used as references for inter-layer prediction. When the maximum number of sub-layers for inter-layer prediction (max_sublayer_for_ilp_plus1) is not present, the maximum number of sub-layers for inter-layer prediction (max_sublayer_for_ilp_plus1[i]) 208 is unspecified.

In JCTVC-L1008, JCTVC-L0452 and JCTVC-L0453, a marking process for sub-layer non-reference pictures 222 is described. However, the marking process has not utilized the signaling of the maximum number of sub-layers for inter-layer prediction (max_sublayer_for_ilp_plus1) 208. Benefits may be realized by using a new method for marking pictures used for inter-layer prediction. When using the new method for marking pictures used for inter-layer prediction, sub-layer non-reference pictures 222 of target layers could be marked "unused for reference" based on the sequence level use of sub-layer and RAP pictures of various layers for inter-layer prediction.

The decoding process as defined in JCTVC-L1008 is given below as section F.8. A similar process was also specified in JCTVC-L0452 and JCTVC-L0453.

F.8 Decoding Process

F.8.1 General Decoding Process

The specifications in subclause 8.1 apply with following additions.

When the current picture has nuh_layer_id greater than 0, the following applies.

Depending on the value of separate_colour_plane_flag, the decoding process is structured as follows:

If separate_colour_plane_flag is equal to 0, the following decoding process is invoked a single time with the current picture being the output.

Otherwise (separate_colour_plane_flag is equal to 1), the following decoding process is invoked three times. Inputs to the decoding process are all NAL units of the coded picture with identical value of colour_plane_id. The decoding process of NAL units with a particular value of colour_plane_id is specified as if only a CVS with monochrome format with that particular value of colour_plane_id would be present in the bitstream. The output of each of the three decoding processes is assigned to one of the 3 sample arrays of the current picture, with the NAL units with colour_plane_id equal to 0 being assigned to $S_L$, the NAL units with colour_plane_id equal to 0, 1 and 2 being assigned to $S_L$, $S_{Cb}$ and $S_{Cr}$.

NOTE—The variable ChromaArrayType is derived as 0 when separate_colour_plane_flag is equal to 1 and chroma_format_idc is equal to 3. In the decoding process, the value of this variable is evaluated resulting in operations identical to that of monochrome pictures (when chroma_format_idc is equal to 0).

The decoding process operates as follows for the current picture CurrPic.

For the decoding of the slice segment header of the first slice, in decoding order, of the current picture, the decoding process for starting the decoding of a coded picture with nuh_layer_id greater than 0 specified in subclause F.8.1.1 is invoked.

If ViewId[nuh_layer_id] is greater than 0, the decoding process for a coded picture with nuh_layer_id greater than 0 specified in subclause G.8.1 is invoked.

Otherwise, when DependencyId[nuh_layer_id] is greater than 0, the decoding process for a coded picture with nuh_layer_id greater than 0 specified in subclause X.X.X is invoked.

After all slices of the current picture have been decoded, the decoding process for ending the decoding of a coded picture with nuh_layer_id greater than 0 specified in subclause F.8.1.2 is invoked.

F.8.1.1 Decoding Process for Starting the Decoding of a Coded Picture with nuh_layer_id Greater Than 0

Each picture referred to in this subclause is a complete coded picture.

The decoding process operates as follows for the current picture CurrPic:

1. The decoding of NAL units is specified in subclause 8.2.
2. The processes in subclause 8.3 specify the following decoding processes using syntax elements in the slice segment layer and above:

Variables and functions relating to picture order count are derived in subclause 8.3.1. This needs to be invoked only for the first slice segment of a picture. It is a requirement of bitstream conformance that PicOrderCntVal shall remain unchanged within an access unit.

The decoding process for RPS in subclause 8.3.2 is invoked for pictures with nuh_layer_id equal to that of CurrPic, wherein reference pictures may be marked as "unused for reference" or "used for long-term reference". This needs to be invoked only for the first slice segment of a picture.

When CurrPic is a BLA picture or is a CRA picture with NoRaslOutputFlag equal to 1, the decoding process for generating unavailable reference pictures specified in subclause 8.3.3 is invoked, which needs to be invoked only for the first slice segment of a picture.

F.8.1.2 Decoding Process for Ending the Decoding of a Coded Picture with nuh_layer_id Greater Than 0

PicOutputFlag is set as follows:

If the current picture is a RASL picture and NoRaslOutputFlag of the associated IRAP picture is equal to 1, PicOutputFlag is set equal to 0.

Otherwise, PicOutputFlag is set equal to pic_output_flag.

The following applies:

The decoded picture is marked as "used for short-term reference".

When TemporalId is equal to HighestTid, the marking process for sub-layer non-reference pictures not needed for inter-layer prediction specified in subclause F.8.1.2.1 is invoked with latestDecLayerId equal to nuh_layer_id as input.

F.8.1.2.1 Marking Process for Sub-Layer Non-Reference Pictures Not Needed for Inter-Layer Prediction
Input to this process is:
a nuh_layer_id value latestDecLayerId
Output of this process is:
potentially updated marking as "unused for reference" for some decoded pictures
NOTE—This process marks pictures that are not needed for inter or inter-layer prediction as "unused for reference". When TemporalId is less than HighestTid, the current picture may be used for reference in inter prediction and this process is not invoked.

The variables TargetDecLayerIdList, numTargetDecLayers, and latestDecIdx are derived as follows:

The layer identifier list TargetDecLayerIdList, which specifies the list of nuh_layer_id values, in increasing order of nuh_layer_id values, of the NAL units to be decoded, is specified as follows:

If some external means, is available to set TargetDecLayerIdList, TargetDecLayerIdList is set by the external means.
Otherwise, if the decoding process is invoked in a bitstream conformance test TargetDecLayerIdList is set accordingly.
Otherwise, TargetDecLayerIdList contains only one nuh_layer_id value that is equal to 0.

numTargetDecLayers is set equal to the number of entries in TargetDecLayerIdList.

latestDecIdx is set equal to the value of i for which TargetDecLayerIdList[i] is equal to latestDecLayerId.

As used above, separate_colour_plane_flag refers to a flag that indicates how many separate colour planes are used to code a picture. The term colour_plane_id refers to the identifier of a colour component. The term ChromaArrayType refers to the type of Chroma Array. The terms $S_L$, $S_{Cb}$, and $S_{Cr}$ refer to sample arrays. The term NAL refers to the network abstraction layer (NAL). The term PicOrderCntVal refers to the picture order count of the current picture. CurrPic refers to the current picture. The term NoRaslOutputFlag refers to a flag used to indicate whether a random access skipped leading (RASL) picture is output (and whether the picture is correctly decodable). The term pic_output_flag refers to a syntax element that may be present in the associated slice headers. The term TargetDecLayerIdList is a layer identifier list which specifies the list of nuh_layer_id values, in increasing order of nuh_layer_id values, of the NAL unites to be decoded. The term NumNegativePics specifies the number of entries in the stRpsIdx-th candidate short-term reference picture set (RPS) that have picture order count values greater than the picture order count value of the current picture.

The term UsedByCurrPicS0 specifies whether the i-th entry in the stRpsIdx-th candidate short-term RPS that has picture order count values less than that of the current picture are used for reference by the current picture. The term UsedByCurrPicS1 specifies whether the i-th entry in the current candidate short-term RPS that has picture order count values greater than that of the current picture are used for reference by the current picture.

The term num_long_term_sps specifies the number of entries in the long-term RPS of the current picture that are derived based on the candidate long-term reference pictures specified in the active SPS. The term num_long_term_pics specifies the number of entries in the long-term RPS of the current picture that are directly signaled in the slice header. The term UsedByCurrPicLt specifies whether the i-th entry in the long-term RPS of the current picture is used for reference by the current picture.

The layer_id_in_nuh[i] specifies the value of the nuh_layer_id syntax element in VCL NAL units of the i-th layer. When not present, the value of layer_id_in_nuh[i] is inferred to be equal to i. The variable LayerIdInVps[layer_id_in_nuh [i]] is set equal to i. The direct_dependency_flag[i][j] equal to 0 specifies that the layer with index j is not a direct reference layer for the layer with index i. The variable direct_dependency_flag[i][j] equal to 1 specifies that the layer with index j may be a direct reference layer for the layer with index i. When direct_dependency_flag[i][j] is not present for i and j in the range of 0 to vps_max_layers_minus1, it is inferred to be equal to 0. The variables NumDirectRefLayers[i] and RefLayerId[i][j] are derived as follows:

```
for( i = 1; i <= vps_max_layers_minus1; i++ )
  for( j = 0, NumDirectRefLayers[ i ] = 0; j < i; j++ )
    if( direct_dependency_flag[ i ][ j ] = = 1 )
      RefLayerId[ i ][ NumDirectRefLayers[ i ]++ ] = layer_id_in_nuh[ j ]
```

The scalability_mask[i] equal to 1 indicates that dimension_id syntax elements corresponding to the i-th scalability dimension as sown in table "Mapping of ScalabiltyId to scalability dimensions" are present. The variable scalability_mask[i] equal to 0 indicates that dimension_id syntax elements corresponding to the i-th scalability dimension are not present. The mapping of ScalabilityId to scalability dimensions is given below in Table F-1

TABLE F-1

Mapping of ScalabiltyId to scalability dimensions

| scalability_mask index | Scalability dimension | ScalabilityId mapping |
| --- | --- | --- |
| 0 | multiview | ViewId |
| 1 | spatial/SNR scalability | DependencyId |
| 2-15 | Reserved | |

The dimension_id[i][j] specifies the identifier of the j-th present scalability dimension type of the i-th layer. When not present, the value of dimension_id[i][j] is inferred to be equal to 0. The number of bits used for the representation of dimension_id[i][j] is dimension_id_len_minus1 [j]+1 bits. When splitting_flag is equal to 1, it is a requirement of bitstream conformance that dimension_id[i][j] shall be equal to ((layer_id_in_nuh[i] & ((1<<dimBitOffset[j+1])−1))>> dimBitOffset[j]).

The variable ScalabilityId[i][smIdx] specifying the identifier of the smIdx-th scalability dimension type of the i-th layer, the variable ViewId[layer_id_in_nuh[i]] specifying the view identifier of the i-th layer and DependencyId [layer_id_in_nuh[i]] specifying the spatial/SNR scalability identifier of the i-th layer are derived as follows:

```
for (i = 0; i <= vps_max_layers_minus1; i++) {
  for( smIdx= 0, j =0; smIdx< 16; smIdx ++ )
    if( ( i ! = 0) && scalability_mask[ smIdx ] )
      ScalabilityId[ i ][ smIdx ] = dimension_id[ i ][ j++ ]
    else
      ScalabilityId[ i ][ smIdx ] = 0
  ViewId[ layer_id_in_nuh[ i ] ] = ScalabilityId[ i ][ 0 ]
  DependencyId [ layer_id_in_nuh[ i ] ] = ScalabilityId[ i ][ 1 ]
}
```

The HighestTid is the highest temporal identifier (TemporalId) present in the bitstream. The PicOutputFlag is a variable which is set based on the picture type (e.g. if a picture is a random access skipped leading picture) and based on a signaled syntax element pic_output_flag.

In one configuration, section F.8.1.2.1 may include the language of Table 2 for marking pictures 222 as "unused for reference."

TABLE 2

```
for( i = 0; i <= latestDecIdx; i++ ) {
   if( the picture with picture order count equal to PicOrderCntVal and temporal ID
TemporalId and with nuh_layer_id equal to TargetDecLayerIdList[ i ] is not marked as
   "unused for reference" and is a sub-layer non-reference picture ) {
      remainingInterLayerReferencesFlag = 0
      for( j = latestDecIdx + 1; j < numTargetDecLayers; j++ )
         for( k = 0; k <
NumDirectRefLayers[ LayerIdInVps[ TargetDecLayerIdList[ j ] ] ]; k++ )
            if( TargetDecLayerIdList[ i ] = =
RefLayerId[ LayerIdInVps[ TargetDecLayerIdList[ j ] ][ k ] )
               if(TemporalId < =
(max_sublayer_for_ilp_plus1]LayerIdInVps[ TargetDecLayerIdList [i]]] -1))
                  remainingInterLayerReferencesFlag = 1
      if( !remainingInterLayerReferencesFlag )
         mark the picture with picture order count equal to PicOrderCntVal and
temporal and temporal ID TemporalId and with nuh_layer_id equal to
TargetDecLayerIdList[ i ] as
            "unused for reference"
   }
}
```

In Table 2, each sub-layer non-reference picture 222 has a defined temporal identifier (TemporalId) 224. The temporal identifier (TemporalId) 224 of a picture 222 is compared with the maximum number of sub-layers for inter-layer prediction (max_sublayer_for_ilp_plus1) 208 for the specified layer (i.e., LayerIdInVps[TargetDecLayerIdList[i]]). Thus, the index for max_sublayer_for_ilp_plus1 is LayerIdInVps[TargetDecLayerIdList[i]]. If the temporal identifier (TemporalId) 224 of the picture 222 is greater than max_sublayer_for_ilp_plus1 208-1 for the specified layer, then that picture 222 is marked as "unused for reference." In Table 2, TargetDecLayerIdList refers to the target layer identifier list. Thus, in the marking stage, such pictures are marked as "unused for reference" even if the pictures belong to a layer which is used as a reference layer by any layer in the target layer identifier list.

In another configuration, section F.8.1.2.1 may include the language of Table 3 for marking pictures 222 as "unused for reference."

TABLE 3

```
for( i = 0; i <= latestDecIdx; i++ ) {
   if( the picture with picture order count equal to PicOrderCntVal and temporal ID
TemporalId and with nuh_layer_id equal to TargetDecLayerIdList[ i ] is not marked as
   "unused for reference" and is a sub-layer non-reference picture ) {
      remainingInterLayerReferencesFlag = 0
      for( j = latestDecIdx + 1; j < numTargetDecLayers; j++ )
         for( k = 0; k <
NumDirectRefLayers[ LayerIdInVps[ TargetDecLayerIdList[ j ] ] ]; k++ )
            if( TargetDecLayerIdList[ i ] = =
RefLayerId[ LayerIdInVps[ TargetDecLayerIdList[ j ] ][ k ] )
               if(TemporalId < = (max_sublayer_for_ilp_plus1[i] -1))
                  remainingInterLayerReferencesFlag = 1
      if( !remainingInterLayerReferencesFlag )
         mark the picture with picture order count equal to PicOrderCntVal and
temporal ID TemporalId and with nuh_layer_id equal to TargetDecLayerIdList[ i ] as
            "unused for reference"
   }
}
```

Like Table 2, each picture 222 has a defined temporal identifier (TemporalId) 224 in Table 3. However, in Table 3, the temporal identifier (TemporalId) 224 of a picture 222 is compared with max_sublayer_for_ilp_plus1[i]. If the temporal identifier (TemporalId) 224 of the picture 222 is greater than max_sublayer_for_ilp_plus1[i]−1, then that picture 222 is marked as "unused for reference." In Table 3, TargetDecLayerIdList refers to the target layer identifier list. Thus, in the marking stage, such pictures are marked as "unused for reference" even if they belong to a layer which is used as a reference layer by any layer in the target layer identifier list.

In yet another configuration, section F.8.1.2.1 may include the language of Table 4 for marking pictures 222 as "unused for reference."

TABLE 4

```
for( i = 0; i <= latestDecIdx; i++ ) {
   if( the picture with picture order count equal to PicOrderCntVal and temporal ID
```

TABLE 4-continued

```
TemporalId and with nuh_layer_id equal to TargetDecLayerIdList[ i ] is not marked as
    "unused for reference" and is a sub-layer non-reference picture ) {
        remainingInterLayerReferencesFlag = 0
        for( j = latestDecIdx + 1; j < numTargetDecLayers; j++ )
            for( k = 0; k <
NumDirectRefLayers[ LayerIdInVps[ TargetDecLayerIdList[ j ] ] ]; k++ )
            if( TargetDecLayerIdList[ i ] = =
RefLayerId[ LayerIdInVps[ TargetDecLayerIdList[ j ] ][ k ] )
                if(TemporalId < =
(max_sublayer_for_ilp_plus1[LayerIdInVps[ TargetDecLayerIdList [i]]] -1))
                    remainingInterLayerReferencesFlag = 1
        if( !remainingInterLayerReferencesFlag )
            mark the picture with picture order count equal to PicOrderCntVal and with
nuh_layer_id equal to TargetDecLayerIdList[ i ] as
                "unused for reference"
    }
}
```

The language in Table 4 is similar to that of Table 2, except that Table 4 does not include specific language about the temporal identifier (TemporalId) 224 in the marking language. In this case, the additional check about the temporal identifier (TemporalId) 224 value of the picture 222 is not done at this stage when marking the picture 222.

In another configuration, section F.8.1.2.1 may include the language of Table 5 for marking pictures 222 as "unused for reference."

TABLE 5

```
for( i = 0; i <= latestDecIdx; i++ ) {
    if( the picture with picture order count equal to PicOrderCntVal and temporal ID
TemporalId and with nuh_layer_id equal to TargetDecLayerIdList[ i ] is not marked as
    "unused for reference" and is a sub-layer non-reference picture ) {
        remainingInterLayerReferencesFlag = 0
        for( j = latestDecIdx + 1; j < numTargetDecLayers; j++ )
            for( k = 0; k <
NumDirectRefLayers[ LayerIdInVps[ TargetDecLayerIdList[ j ] ] ]; k++ )
            if( TargetDecLayerIdList[ i ] = =
RefLayerId[ LayerIdInVps[ TargetDecLayerIdList[ j ] ][ k ] )
                if(TemporalId < = (max_sublayer_for_ilp_plus1[i] -1))
                    remainingInterLayerReferencesFlag = 1
        if( !remainingInterLayerReferencesFlag )
            mark the picture with picture order count equal to PicOrderCntVal and with
nuh_layer_id equal to TargetDecLayerIdList[ i ] as
                "unused for reference"
    }
}
```

The language in Table 5 is similar to the language in Table 3, except that Table 5 does not include specific language about the temporal identifier (TemporalId) 224 in the marking language. In this case, the additional check about the temporal identifier (TemporalId) 224 value of the picture 222 is not done at this stage when marking the picture 222.

Figure 3:
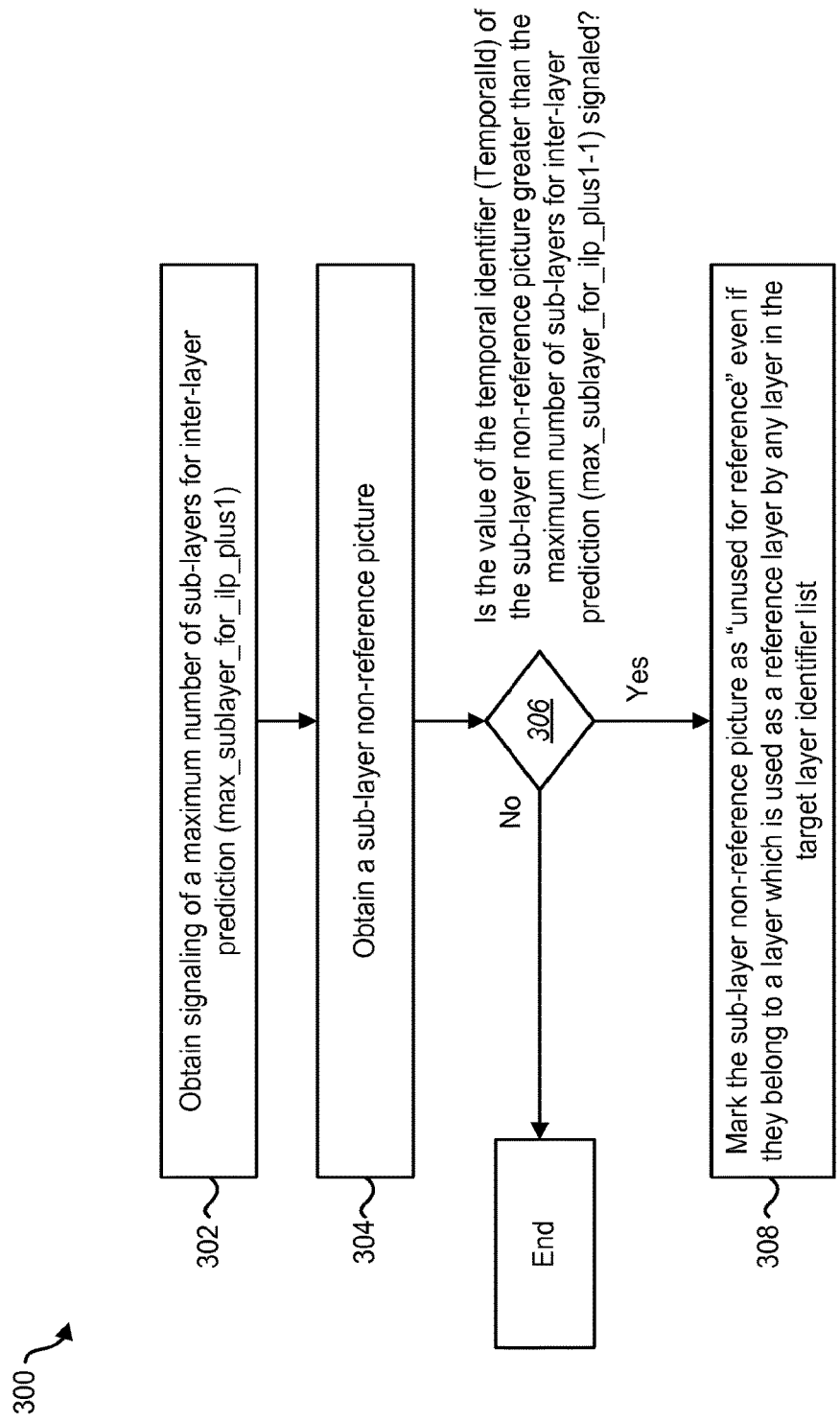
FIG. 3 is a flow diagram of a method for marking sub-layer non-reference pictures.

FIG. 3 is a flow diagram of a method 300 for marking sub-layer non-reference pictures 222. The method 300 may be performed by an electronic device 102. In one configuration, the method 300 may be performed by a video decoder 112 on the electronic device 102. The electronic device 102 may obtain 302 signaling of a maximum number of sub-layers for inter-layer prediction (max_sublayer_for_ilp_plus1) 208. As discussed above, the maximum number of sub-layers for inter-layer prediction (max_sublayer_for_ilp_plus1) 208 may be provided to the electronic device 102 via a bitstream 110.

The electronic device 102 may also obtain 304 a sub-layer non-reference picture 222. The sub-layer non-reference picture 222 may also be provided to the electronic device 102 via the bitstream 110. The electronic device 102 may determine 306 whether the value of a temporal identifier (TemporalId) 224 of the sub-layer non-reference picture 222 is greater than the maximum number of sub-layers for inter-layer prediction (max_sublayer_for_ilp_plus1) 208-1. In one configuration, the electronic device 102 may compare the temporal identifier (TemporalId) 224 of the sub-layer non-reference picture 222 with the maximum number of sub-layers for inter-layer prediction (max_sublayer_for_il-p_plus1) 208 using the language of one of Table 2, Table 3, Table 4 or Table 5 described above.

If the value of the temporal identifier (TemporalId) 224 of the sub-layer non-reference picture 222 is greater than the maximum number of sub-layers for inter-layer prediction (max_sublayer_for_ilp_plus1) 208-1, the electronic device 102 may mark 308 the sub-layer non-reference picture 222 as "unused for reference," even if they belong to a layer which is used as a reference layer by any layer in the target layer identifier list. Thus, the sub-layer non-reference picture 222 will not be used for inter-layer prediction. If the value of the temporal identifier (TemporalId) 224 of the sub-layer non-reference picture 222 is not greater than the maximum number of sub-layers for inter-layer prediction (max_sublayer_for_ilp_plus1) 208-1, the method 300 may end. In other words, if the value of the temporal identifier (TemporalId) 224 of the sub-layer non-reference picture 222 is less than or equal to the maximum number of sub-layers for inter-layer prediction (max_sublayer_for_ilp_plus1) 208-1, the sub-layer non-reference picture 222 is not marked as "unused for reference" and may be used for inter-layer prediction if they belong to a layer which is used as a reference layer by any layer in the target identifier list.

In another scenario (not shown), sub-layer not reference pictures 222 which belong to layer which is not used as a reference layer by any layer in the target identifier list are also marked as "unused for reference." In some cases, the steps described in FIG. 3 may be only executed for marking sub-layer non-reference pictures 222 when their temporal identifier (TemporalId) 224 is equal to the highest temporal identifier present in the bitstream.

Figure 4:
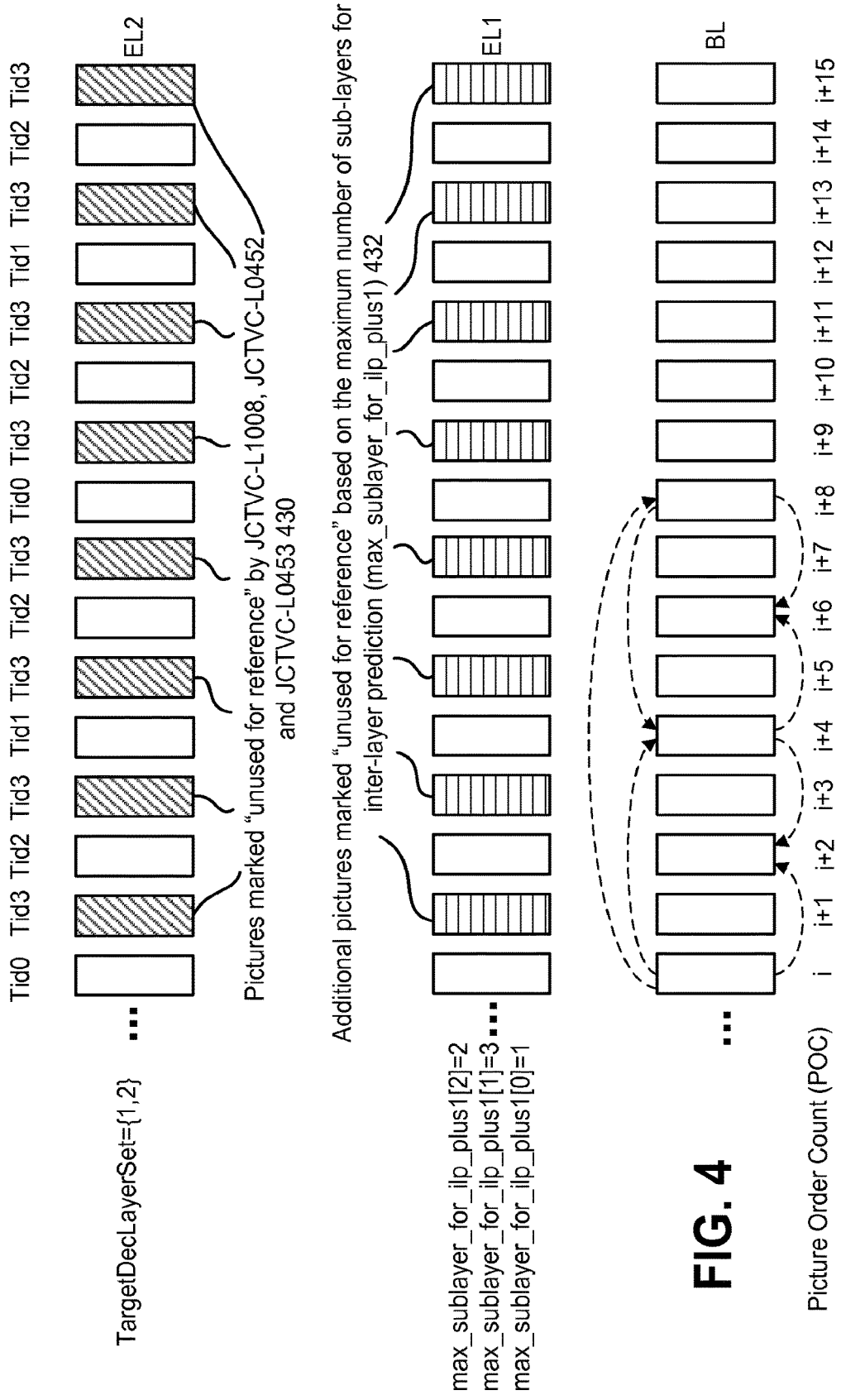
FIG. 4 is a block diagram illustrating the additional pictures marked as "unused for reference" using the present systems and methods.

FIG. 4 is a block diagram illustrating the additional pictures 432 marked as "unused for reference" using the present systems and methods. In the example illustrated, three layers are used (one base layer and two enhancement layers) along with temporal sub-layers. In the second enhancement layer EL2, multiple pictures 430 are marked as "unused for reference" by the standards defined in JCTVC-L1008, JCTVC-L0452 and JCTVC-L0453. In the first enhancement layer EL1, additional pictures 432 are marked "unused for reference" based on the maximum number of sub-layers for inter-layer prediction (max_sublayer_for_ilp_plus1) 208. By marking additional pictures 432 as "unused for reference," the decoded picture buffer (DPB) size/memory may be reduced.

Figure 5:
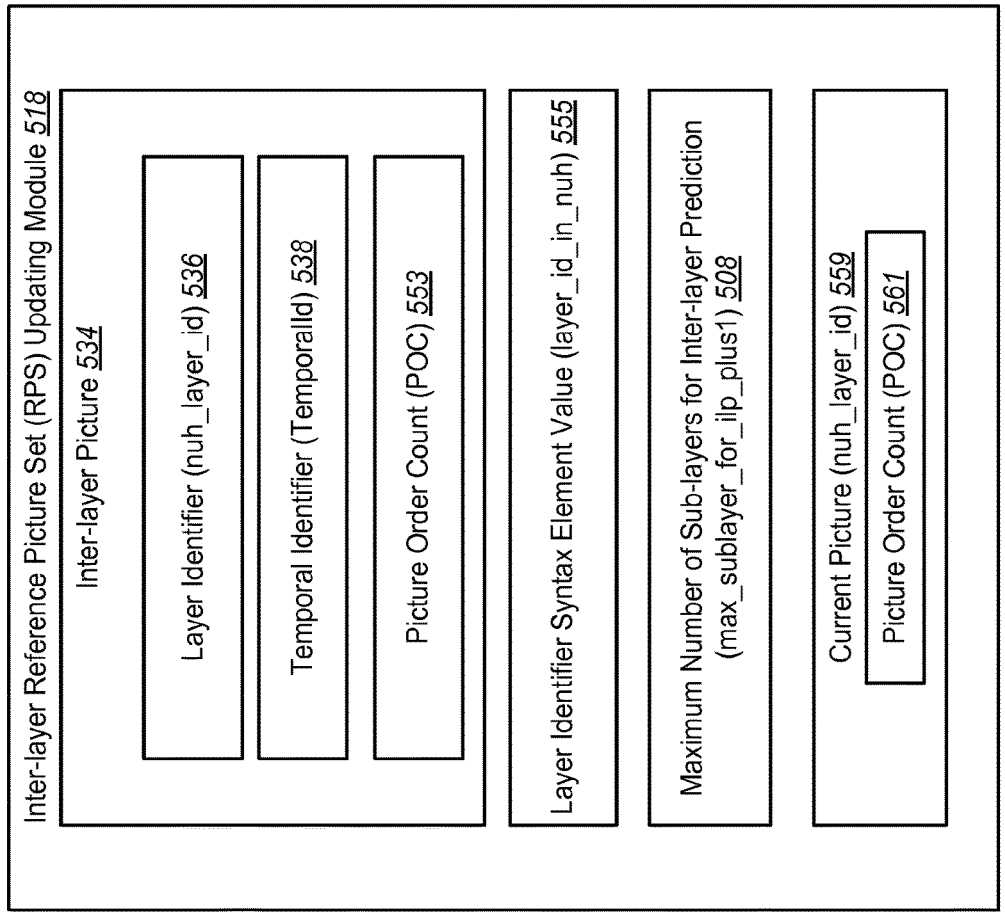
FIG. 5 is a block diagram illustrating an inter-layer reference picture set (RPS) updating module.

FIG. 5 is a block diagram illustrating an inter-layer reference picture set (RPS) updating module 518. The inter-layer reference picture set (RPS) updating module 518 of FIG. 5 may be one configuration of the inter-layer reference picture set (RPS) updating module 118 of FIG. 1.

The additional check performed compares the temporal identifier (TemporalId) 538 of the inter-layer picture 534 with a signaled maximum number of sub-layers for inter-layer prediction (max_sublayer_for_ilp_plus1) 508. If the value of the temporal identifier (TemporalId) 538 for the inter-layer picture 534 is greater than the maximum number of sub-layers for inter-layer prediction (max_sublayer_for_ilp_plus1) 508-1, then the inter-layer picture 534 is not added to the inter-layer reference picture set (RPS) (RefPicSetInterLayer) 120. Likewise, if the value of the temporal identifier (TemporalId) 538 for the inter-layer picture 534 is less than or equal to the maximum number of sub-layers for inter-layer prediction (max_sublayer_for_ilp_plus1) 508-1, then the inter-layer picture 534 is added to the inter-layer reference picture set (RPS) (RefPicSetInterLayer) 120. Additionally, if the value of the maximum number of sub-layers for inter-layer prediction (max_sublayer_for_ilp_plus1) 508 is 0, then the inter-layer picture 534 is not added to the inter-layer reference picture set (RPS) (RefPicSetInterLayer) 120 unless the inter-layer picture 534 is a random access point (RAP) picture.

The semantics as defined in JCTVC-1008 are given below in section G.7.4.7.2 (with changes underlined that are added for the present systems and methods). A similar process was also specified in JCTVC-L0452 and JCTVC-L0453.

G.7.4.7.2 Semantics

The specifications of subclause F.7.4.7.2 and all its sub-clauses apply with the following modification.

The variable NumPocTotalCurr is derived as follows.

```
NumPocTotalCurr = 0
for( i = 0; i < NumNegativePics[ StRpsIdx ]; i++)
    if(UsedByCurrPicS0[ StRpsIdx ][ 1 ] = = 1)
        NumPocTotalCurr++
for( i = 0; i < NumPositivePics[ StRpsIdx ]; i++)                    (xx)
    if(UsedByCurrPicS1[ StRpsIx ][ i ] = = 1)
        NumPocTotalCurr++
for( i = 0; i < num_long_term_sps + num_long_term_pics; i++ )
    if( UsedByCurrPicLt[ i ] = = 1)
        NumPocTotalCurr++
NumPocTotalCurr += NumInterLayerRPSPics[LayerIdInVps[ nuh_layer_id]]
```

The inter-layer reference picture set (RPS) updating module 518 may be part of a video decoder 112 on an electronic device 102. The inter-layer reference picture set (RPS) updating module 518 may be used by the video decoder 112 to update an inter-layer reference picture set (RPS) (RefPicSetInterLayer) 120.

The inter-layer reference picture set (RPS) updating module 518 may include an inter-layer picture 534. In one configuration, the inter-layer picture 534 may be a non-RAP (random access point) picture or a random access point (RAP) picture. The inter-layer picture 534 may be a picture received from another electronic device 102 via a bitstream 110. The inter-layer reference picture set (RPS) updating module 518 may determine whether the inter-layer picture 534 is added to the reference picture set (RPS) 120.

The inter-layer picture 534 may include a layer identifier (nuh_layer_id) 536, a temporal identifier (TemporalId) 538 and a picture order count (POC) 553. An additional check is performed (to determine if the inter-layer picture 534 should be added to the reference picture set (RPS) 120) if the layer identifier (nuh_layer_id) 536 for the inter-layer picture 534 corresponds to the layers which are direct reference layers for the current layer and the picture order count (POC) 553 of the inter-layer picture 534 is equal to a picture order count (POC) 561 of the current picture (nuh_layer_id) 559.

In the sample code provided above, NumInterLayerRPSPics replaces NumDirectRefLayers.

The decoding process as defined in JCTVC-L1008 is given below in section G.2 (with changes underlined that are added for the present systems and methods). A similar process was also specified in JCTVC-L0452 and JCTVC-L0453.

G.2 Decoding Process

G.2.1 Decoding Process for a Coded Picture with nuh_layer_id Greater Than 0

The decoding process operates as follows for the current picture CurrPic:

1. The decoding of NAL units is specified in subclause 8.2.
2. The processes in subclause G.8.1.1 and G.8.3.4 specify the following decoding processes using syntax elements in the slice segment layer and above:
    Prior to decoding the first slice of the current picture, subclause G.8.1.1 is invoked.
    At the beginning of the decoding process for each P or B slice, the decoding process for reference picture lists construction specified in subclause G.8.3.4 is invoked for derivation of reference picture list 0 (RefPicList0), and when decoding a B slice, reference picture list 1 (RefPicList1).
3. The processes in subclauses 8.4, 8.5, 8.6, and 8.7 specify decoding processes using syntax elements in all syntax structure layers. It is a requirement of bitstream conformance that the coded slices of the picture shall contain slice segment data for every coding tree unit of the picture, such that the division of the picture into slices, the division of the slices into slice segments, and the division of the slice segments into coding tree units each form a partitioning of the picture.

4. After all slices of the current picture have been decoded, the marking process for ending the decoding of a coded picture with nuh_layer_id greater than 0 specified in subclause G.8.1.2 is invoked.

G.2.1.1 Decoding Process for Inter-Layer Reference Picture Set

Output of this process is an updated list of inter-layer pictures RefPicSetInterLayer.

The list RefPicSetInterLayer is first emptied and then derived as follows.

```
for( i = 0, NumInterLayerRPSPics[LayerIdInVps[ nuh_layer_id ] ]=0; i <
NumDirectRefLayers[ LayerIdInVps[ nuh_layer_id ] ]; i++ ) {
    rPic = the picture with picture order count equal to PicOrderCnt and temporal ID
TemporalId and nuh_layer_id equal to RefLayerId[ LayerIdInVps[ nuh_layer_id ][ i ] ]
    if( (TemporalId < = (max_sublayer_for_ilp_plus1[LayerIdInVps
[RefLayerId[ LayerIdInVps[ nuh_layer_id]][ i ] ]] -1)) ||
((max_sublayer_for_ilp_plus1[LayerIdInVps
[RefLayerId[ LayerIdInVps[ nuh_layer_id]][ i ] ]]==0) && (rPic is a RAP picture))
{
    RefPicSetInterLayer[NumInterLayerRPSPics[LayerIdInVps[ nuh_layer_id ]++ ] = rPic
    rPic is marked as "used for long-term reference"
}
}
```

In the amendments for section G.2.1.1, the temporal identifier (TemporalId) 538 is taken into account when determining whether to add an inter-layer picture 534 to an inter-layer reference picture set (RPS) (RefPicSetInterLayer) 120. If the value of the temporal identifier (TemporalId) 538 of an inter-layer picture 534 is less than or equal to the value of the maximum number of sub-layers for inter-layer prediction (max_sublayer_for_ilp_plus1) 508-1, then the inter-layer picture 534 is added to the inter-layer reference picture set (RPS) (RefPicSetInterLayer) 120 and is used for inter-layer prediction. Also, if the value of the maximum number of sub-layers for inter-layer prediction (max_sublayer_for_ilp_plus1) 508-1 is zero, then the inter-layer picture 534 is not added to the inter-layer reference picture set (RPS) (RefPicSetInterLayer) 120 and the inter-layer picture 534 is not used for inter-layer prediction. Also, if the value of the maximum number of sub-layers for inter-layer prediction (max_sublayer_for_ilp_plus1) 508-1 is zero, then the inter-layer picture 534 is not added to the inter-layer reference picture set (RPS) (RefPicSetInterLayer) 120 if the inter-layer picture 534 is not an RAP picture. The value of the temporal identifier (TemporalId) 538 of an inter-layer picture 534 may only be compared with the value of the maximum number of sub-layers for inter-layer prediction (max_sublayer_for_ilp_plus1) 508 when the layer identifier (nuh_layer_id) 536 values correspond to the layers which are direct reference layers for the current picture (nuh_layer_id) 559 and the picture order count 553 of the inter-layer picture is equal to the picture order count (POC) 561 of the current picture (nuh_layer_id) 559.

An alternative configuration for determining whether an inter-layer picture 534 is added to an inter-layer reference picture set (RPS) (RefPicSetInterLayer) 120 as defined in JCTVC-L1008 is given below in section G.2.1.2 (with changes underlined that are added for the present systems and methods). A similar process was also specified in JCTVC-L0452 and JCTVC-L0453.

G.2.1.2 Decoding Process for Inter-Layer Reference Picture Set

Output of this process is an updated list of inter-layer pictures RefPicSetInterLayer.

The list RefPicSetInterLayer is first emptied and then derived as follows.

```
for( i = 0, NumInterLayerRPSPics[LayerIdInVps[ nuh_layer_id ] ]=0; i <
NumDirectRefLayers[ LayerIdInVps[ nuh_layer_id ] ]; i++ ) {
    rPic = the picture with picture order count equal to PicOrderCnt and temporal ID
TemporalId and
        nuh_layer_id equal to RefLayerId[ LayerIdInVps[ nuh_layer_id ][ i ] ]
    if( (TemporalId < =
(max_sublayer_for_ilp_plus1[RefLayerId[ LayerIdInVps[ nuh_layer_id ]][ i ] ] -1)) || (
(max_sublayer_for_ilp_plus1[RefLayerId[ LayerIdInVps[ nuh_layer_id]][ i ] ]==0) &&
(rPic is a RAP picture))
{
    RefPicSetInterLayer[NumInterLayerRPSPics[LayerIdInVps[ nuh_layer_id ]++ ] = rPic
    rPic is marked as "used for long-term reference"
}
}
```

Like the decoding process for inter-layer reference picture sets (RPSs) 120 described in G.2.1.1, the decoding process for inter-layer reference picture sets (RPSs) 120 described in G.2.1.2 uses the maximum number of sub-layers for inter-layer prediction (max_sublayer_for_ilp_plus1) 508 to determine whether an inter-layer picture 534 is added to the inter-layer reference picture set (RPS) (refPicSetInterLayer) 120.

Another configuration for determining whether an inter-layer picture 534 is added to an inter-layer reference picture set (RPS) (RefPicSetInterLayer) 120 as defined in JCTVC-L1008 is given below in section G.2.1.3 (with changes underlined that are added for the present systems and methods). A similar process was also specified in JCTVC-L0452 and JCTVC-L0453.

G.2.1.3 Decoding Process for Inter-Layer Reference Picture Set

Output of this process is an updated list of inter-layer pictures RefPicSetInterLayer.

The list RefPicSetInterLayer is first emptied and then derived as follows.

```
for( i = 0, NumInterLayerRPSPics[LayerIdInVps[ nuh_layer_id] ]=0; i <
NumDirectRefLayers[ LayerIdInVps[ nuh_layer_id ] ]; i++ ) {
  rPic = the picture with picture order count equal to PicOrderCnt and temporal ID
TemporalId and nuh_layer_id equal to RefLayerId[ LayerIdInVps[ currLayerId ][ i ] ]
  if( (TemporalId < =
(max_sublayer_for_ilp_plus1[layer_id_in_nuh[RefLayerId[ LayerIdInVps[ nuh_layer_id ]]
[ i ] ]] -1)) || ( (max_sublayer_for_ilp_plus1[layer_id_in_nuh
[RefLayerId[ LayerIdInVps[ nuh_layer_id]][ i ] ]]==0) && (rPic is a RAP picture))
  {
    RefPicSetInterLayer[NumInterLayerRPSPics[LayerIdInVps[ nuh_layer_id ]++ ] = rPic
    rPic is marked as "used for long-term reference"
  }
}
```

Like the decoding process for inter-layer reference picture sets (RPSs) 120 described in G.2.1.1 and G.2.1.2, the decoding process for inter-layer reference picture sets (RPSs) 120 described in G.2.1.3 uses the maximum number of sub-layers for inter-layer prediction (max_sublayer_for_ilp_plus1) 508 to determine whether an inter-layer picture 534 is added to the inter-layer reference picture set (RPS) (refPicSetInterLayer) 120.

Yet another configuration for determining whether an inter-layer picture 534 is added to an inter-layer reference picture set (RPS) (RefPicSetInterLayer) 120 as defined in JCTVC-L1008 is given below in section G.2.1.4 (with changes underlined that are added for the present systems and methods). A similar process was also specified in JCTVC-L0452 and JCTVC-L0453.

G.2.1.4 Decoding Process for Inter-Layer Reference Picture Set

Output of this process is an updated list of inter-layer pictures RefPicSetInterLayer.

The list RefPicSetInterLayer is first emptied and then derived as follows.

```
for( i = 0, NumInterLayerRPSPics[LayerIdInVps[ nuh_layer_id] ]=0; i <
NumDirectRefLayers[ LayerIdInVps[ nuh_layer_id ] ]; i++ ) {
  rPic = the picture with picture order count equal to PicOrderCnt and temporal ID
TemporalId and nuh_layer_id equal to RefLayerId[ LayerIdInVps[ nuh_layer_id ][ i ] ]
  if( (TemporalId < = (max_sublayer_for_ilp_plus1[layer_id_in_nuh[i]] -1)) || (
(max_sublayer_for_ilp_plus1[layer_id_in_nuh[i]]==0) && (rPic is a RAP picture))
  {
    RefPicSetInterLayer[ NumInterLayerRPSPics[LayerIdInVps[ nuh_layer_id ]++ ] =
    rPic is marked as "used for long-term reference"
  }
}
```

Like the decoding process for inter-layer reference picture sets (RPSs) 120 described in G.2.1.1, G.2.1.2 and G.2.1.3, the decoding process for inter-layer reference picture sets (RPSs) 120 described in G.2.1.4 uses the maximum number of sub-layers for inter-layer prediction (max_sublayer_for_ilp_plus1) 508 to determine whether an inter-layer picture 534 is added to the inter-layer reference picture set (RPS) (refPicSetInterLayer) 120.

Another configuration for determining whether an inter-layer picture 534 is added to an inter-layer reference picture set (RPS) (RefPicSetInterLayer) 120 as defined in JCTVC-L1008 is given below in section G.2.1.5 (with changes underlined that are added for the present systems and methods). A similar process was also specified in JCTVC-L0452 and JCTVC-L0453.

G.2.1.5 Decoding Process for Inter-Layer Reference Picture Set

Output of this process is an updated list of inter-layer pictures RefPicSetInterLayer.

The list RefPicSetInterLayer is first emptied and then derived as follows.

```
for( i = 0, NumInterLayerRPSPics[LayerIdInVps[ nuh_layer_id ] ]=0; i <
NumDirectRefLayers[ LayerIdInVps[ nuh_layer_id ] ]; i++ ) {
  rPic = the picture with picture order count equal to PicOrderCnt and temporal ID
  TemporalId and nuh_layer_id equal to RefLayerId[ LayerIdInVps[ nuh_layer_id ][ i ] ]
  if( (TemporalId < = (max_sublayer_for_ilp_plus1[i] -1)) || (
  (max_sublayer_for_ilp_plus1[i]==0) && (rPic is a RAP picture))
  {
    RefPicSetInterLayer[ NumInterLayerRPSPics[LayerIdInVps[ nuh_layer_id ]++ ] =
    rPic is marked as "used for long-term reference"
  }
}
```

Like the decoding process for inter-layer reference picture sets (RPSs) 120 described in G.2.1.1, G.2.1.2, G.2.1.3 and G.2.1.4, the decoding process for inter-layer reference picture sets (RPSs) described in G.2.1.5 uses the maximum number of sub-layers for inter-layer prediction (max_sublayer_for_ilp_plus1) 508 to determine whether an inter-layer picture 534 is added to the inter-layer reference picture set (RPS) (refPicSetInterLayer) 120.

The marking process for ending the decoding of a coded picture as defined in JCTVC-L1008 is given below in section G.2.1.6 (with changes underlined that are added for the present systems and methods).

G.2.1.6 Marking Process for Ending the Decoding of a Coded Picture with nuh_layer_id Greater than 0

Output of this process is:

a potentially updated marking as "used for short-term reference" for some decoded pictures.

The following applies.

```
for( i = 0; i < NumInterLayerRPSPics [ LayerIdInVps[ nuh_layer_id ] ]; i++ )
  RefPicSetInterLayer[ i ] is marked as "used for short-term reference"
```

At the beginning of the decoding process for each P and B slices, reference picture lists construction is performed. The decoding process for reference picture lists construction as defined in JCTVC-L1008 is given below in section G.2.1.7 (with changes underlined that are added for the present systems and methods). A similar process was also specified in JCTVC-L0452 and JCTVC-L0453.

G.2.1.7 Decoding Process for Reference Picture Lists Construction

This process is invoked at the beginning of the decoding process for each P or B slice. Reference pictures are addressed through reference indices as specified in sub-clause 8.5.3.2.1. A reference index is an index into a reference picture list. When decoding a P slice, there is a single reference picture list RefPicList0. When decoding a B slice, there is a second independent reference picture list RefPicList1 in addition to RefPicList0.

At the beginning of the decoding process for each slice, the reference picture list RefPicList0, and for B slices RefPicList1, are derived as follows.

The variable NumRpsCurrTempList0 is set equal to Max (num_ref_idx_l0_active_minus1+1, NumPocTotalCurr) and the list RefPicListTem0 is constructed as follows:

```
rIdx = 0
while( rIdx < NumRpsCurrTempList0 ) {
   for( i = 0; i < NumPocStCurrBefore && rIdx < NumRpsCurrTempList0; rIdx++, i++ )
      RefPicListTemp0[ rIdx ] = RefPicSetStCurrBefore[ i ]
   for( i = 0; i < NumPocStCurrAfter && rIdx < NumRpsCurrTempList0; rIdx++, i++ )
(8-xx)
      RefPicListTemp0[ rIdx ] = RefPicSetStCurrAfter[ i ]
   for( i = 0; i < NumPocLtCurr && rIdx < NumRpsCurrTempList0; rIdx++, i++ )
      RefPicListTemp0[ rIdx ] = RefPicSetLtCurr[ i ]
   for( i = 0; i < NumInterLayerRPSPics[LayerIdInVps[ nuh_layer_id]]; rIdx++, i++ )
      RefPicListTemp0[ rIdx ] = RefPicSetInterLayer[ i ]
}
```

The list RefPicList0 is constructed as follows:

```
for( rIdx = 0; rIdx <= num_ref_idx_l0_active_minus1; rIdx++)     (8-xx)
   RefPicList0[ rIdx ] = ref_pic_list_modification_flag_l0 ?
RefPicListTemp0[ list_entry_l0[ rIdx ] ] :
   RefPicListTemp0[ rIdx ]
```

When the slice is a B slice, the variable NumRpsCurrTempList1 is set equal to Max(num_ref_idx_l1_active_minus1+1, NumPocTotalCurr) and the list RefPicListTemp1 is constructed as follows:

```
rIdx = 0
while( rIdx < NumRpsCurrTempList1 ) {
   for( i = 0; i < NumPocStCurrAfter && rIdx < NumRpsCurrTempList1; rIdx++, i++ )
      RefPicListTemp1[ rIdx ] = RefPicSetStCurrAfter[ i ]
   for( i = 0; i < NumPocStCurrBefore && rIdx < NumRpsCurrTempList1; rIdx++, i++ ) (8-xx)
      RefPicListTemp1[ rIdx ] = RefPicSetStCurrBefore[ i ]
   for( i = 0; i < NumPocLtCurr && rIdx < NumRpsCurrTempList1; rIdx++, i++ )
      RefPicListTemp1[ rIdx ] = RefPicSetLtCurr[ i ]
   for(i = NumInterLayerRPSPics[LayerIdInVps[ nuh_layer_id]]-1;i >= 0; rIdx++, i-- )
      RefPicListTemp1[ rIdx ] = RefPicSetInterLayer[ i ]
}
```

When the slice is a B slice, the list RefPicList1 is constructed as follows:

```
for( rIdx = 0; rIdx <= num_ref_idx_l1_active_minus1; rIdx++)
                                                               (8-11)
RefPicList1[rIdx] = ref_pic_list_modification_flag_l1 ? RefPicListTemp1[list_entry_l1[rIdx]] :
RefPicListTemp1[ rIdx ]
```

In section G.2.1.7, the number of inter-layer reference picture set (RPS) pictures (NumInterLayerRPSPics) is used instead of the number of direct reference layers (NumDirectRefLayers).

Figure 6:
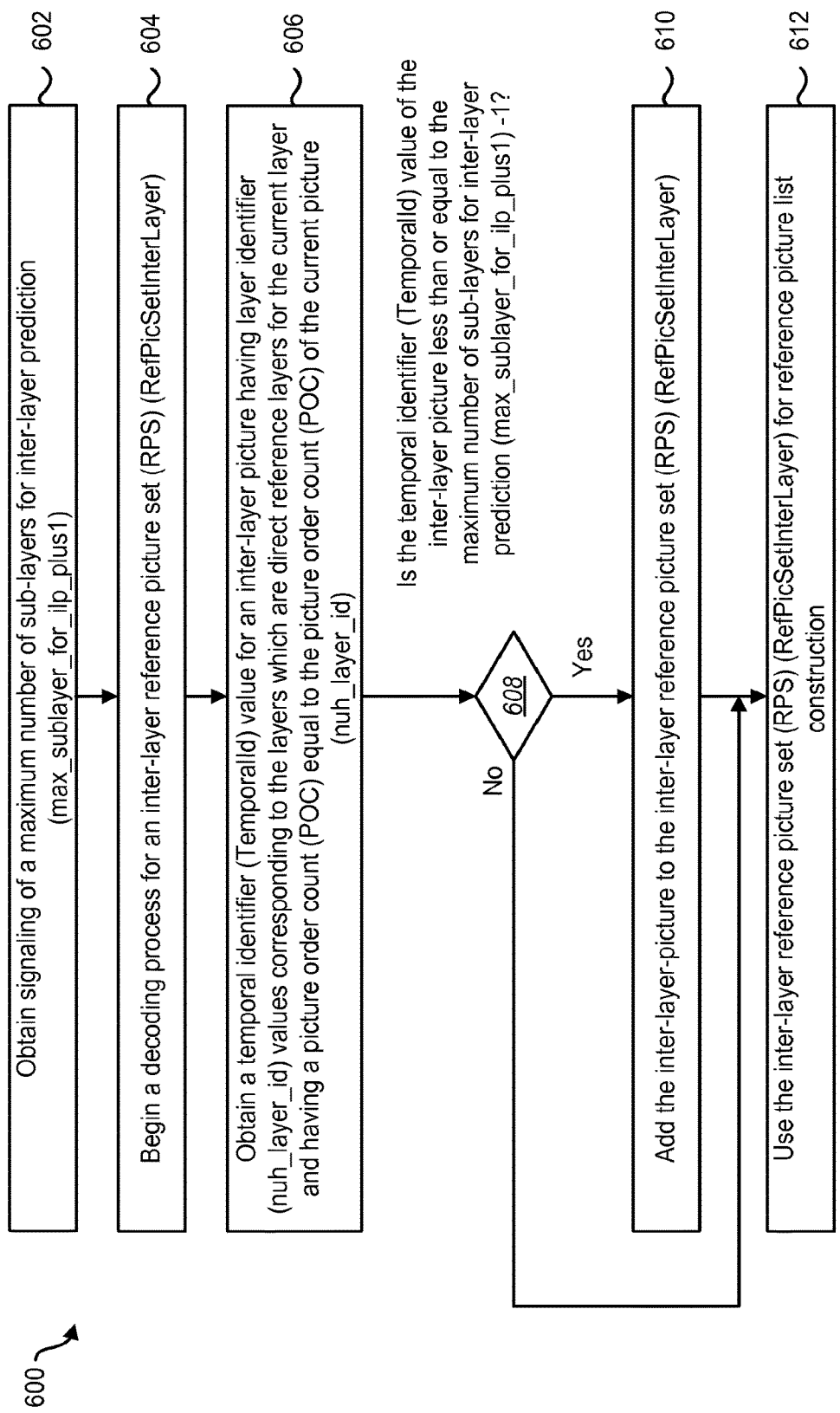
FIG. 6 is a flow diagram of a method for updating an inter-layer reference picture set (RPS) (RefPicSetInter-Layer)

FIG. 6 is a flow diagram of a method 600 for updating an inter-layer reference picture set (RPS) (RefPicSetInterLayer) 120. The method 600 may be performed by an electronic device 102. In one configuration, the method 600 may be performed by a video decoder 112 on the electronic device 102. The electronic device 102 may obtain 602 signaling of a maximum number of sub-layers for inter-layer prediction (max_sublayer_for_ilp_plus1) 508. In one configuration, the electronic device 102 may obtain 602 the signaling of a maximum number of sub-layers for inter-layer prediction (max_sublayer_for_ilp_plus1) 508 via a bitstream 110 from another electronic device 102.

The electronic device 102 may begin 604 a decoding process for an inter-layer reference picture set (RPS) (RefPicSetInterLayer) 120. The electronic device 102 may obtain 606 a temporal identifier (TemporalId) 538 value for an inter-layer picture 534 having layer identifier (nuh_layer_id) 536 values corresponding to the layers which are direct reference layers for the current layer and having a picture order count (POC) 553 equal to the picture order count (POC) 561 of the current picture (nuh_layer_id) 559.

The electronic device 102 may determine 608 whether the temporal identifier (TemporalId) 538 value of the inter-layer picture 534 is less than or equal to the maximum number of sub-layers for inter-layer prediction (max_sublayer_for_ilp_plus1) 508-1. If the temporal identifier (TemporalId) 538 value of the inter-layer picture 534 is less than or equal to the maximum number of sub-layers for inter-layer prediction (max_sublayer_for_ilp_plus1) 508-1, the electronic device 102 may add 610 the inter-layer picture 534 to the inter-layer reference picture set (RPS) (RefPicSetInterLayer) 120. Also, if the value of the maximum number of sub-layers for inter-layer prediction (max_sublayer_for_ilp_plus1) 508-1 is zero, then the inter-layer picture 534 is added to the inter-layer reference picture set (RPS) (RefPicSetInterLayer) 120 if the inter-layer picture 534 is an RAP picture. The electronic device 102 may then use 612 the inter-layer reference picture set (RPS) (RefPicSetInterLayer) 120 for reference picture list construction (e.g., as described above in section G.2.1.7).

If the temporal identifier (TemporalId) 538 value of the inter-layer picture 534 is not less than or equal to the maximum number of sub-layers for inter-layer prediction (max_sublayer_for_ilp_plus1) 508-1 (e.g., the temporal identifier (TemporalId) 538 value of the inter-layer picture 534 is greater than the maximum number of sub-layers for inter-layer prediction (max_sublayer_for_ilp_plus1) 508-1), the inter-layer picture 534 is not added to the inter-layer reference picture set (RPS) (RefPicSetInterLayer) 120. Also, if the value of the maximum number of sub-layers for inter-layer prediction (max_sublayer_for_ilp_plus1) 508-1 is zero, then the inter-layer picture 534 is not added to the inter-layer reference picture set (RPS) (RefPicSetInter-Layer) 120 if the inter-layer picture 534 is not an RAP picture. The electronic device 102 may then use 612 the inter-layer reference picture set (RPS) (RefPicSetInter-Layer) 120 for reference picture list construction (e.g., as described above in section G.2.1.7).

Figure 7:
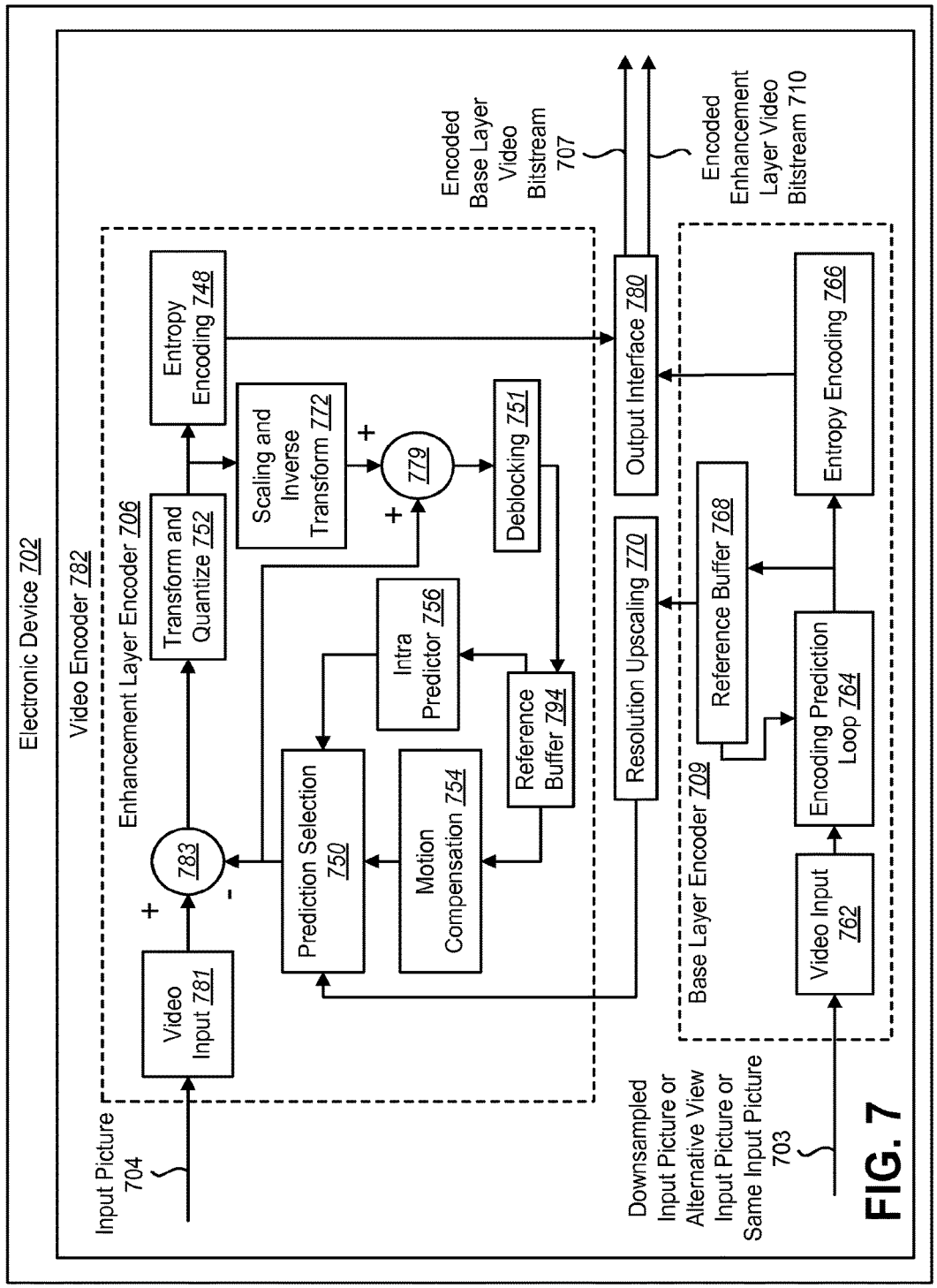
FIG. 7 is a block diagram illustrating one configuration of an encoder on an electronic device.

FIG. 7 is a block diagram illustrating one configuration of a video encoder 782 on an electronic device 702. The video encoder 782 of FIG. 7 may be one configuration of the video encoder 182 of FIG. 1. The video encoder 782 may include an enhancement layer encoder 706, a base layer encoder 709, a resolution upscaling block 770 and an output interface 780.

The enhancement layer encoder 706 may include a video input 781 that receives an input picture 704. The output of the video input 781 may be provided to an adder/subtractor 783 that receives an output of a prediction selection 750. The output of the adder/subtractor 783 may be provided to a transform and quantize block 752. The output of the transform and quantize block 752 may be provided to an entropy encoding 748 block and a scaling and inverse transform block 772. After entropy encoding 748 is performed, the output of the entropy encoding block 748 may be provided to the output interface 780. The output interface 780 may output both the encoded base layer video bitstream 707 and the encoded enhancement layer video bitstream 710.

The output of the scaling and inverse transform block 772 may be provided to an adder 779. The adder 779 may also receive the output of the prediction selection 750. The output of the adder 779 may be provided to a deblocking block 751. The output of the deblocking block 751 may be provided to a reference buffer. An output of the reference buffer 794 may be provided to a motion compensation block 754. The output of the motion compensation block 754 may be provided to the prediction selection 750. An output of the reference buffer 794 may also be provided to an intra predictor 756. The output of the intra predictor 756 may be provided to the prediction selection 750. The prediction selection 750 may also receive an output of the resolution upscaling block 770.

The base layer encoder 709 may include a video input 762 that receives a downsamples input picture or an alternative view input picture or the same input picture 703 (i.e., the same as the input picture 704 received by the enhancement layer encoder 706. The output of the video input 762 may be provided to an encoding prediction loop 764. Entropy encoding 766 may be provided on the output of the encoding prediction loop 764. The output of the encoding prediction loop 764 may also be provided to a reference buffer 768. The reference buffer 768 may provide feedback to the encoding prediction loop 764. The output of the reference buffer 768 may also be provided to the resolution upscaling block 770. Once entropy encoding 766 has been performed, the output may be provided to the output interface 780.

Figure 8:
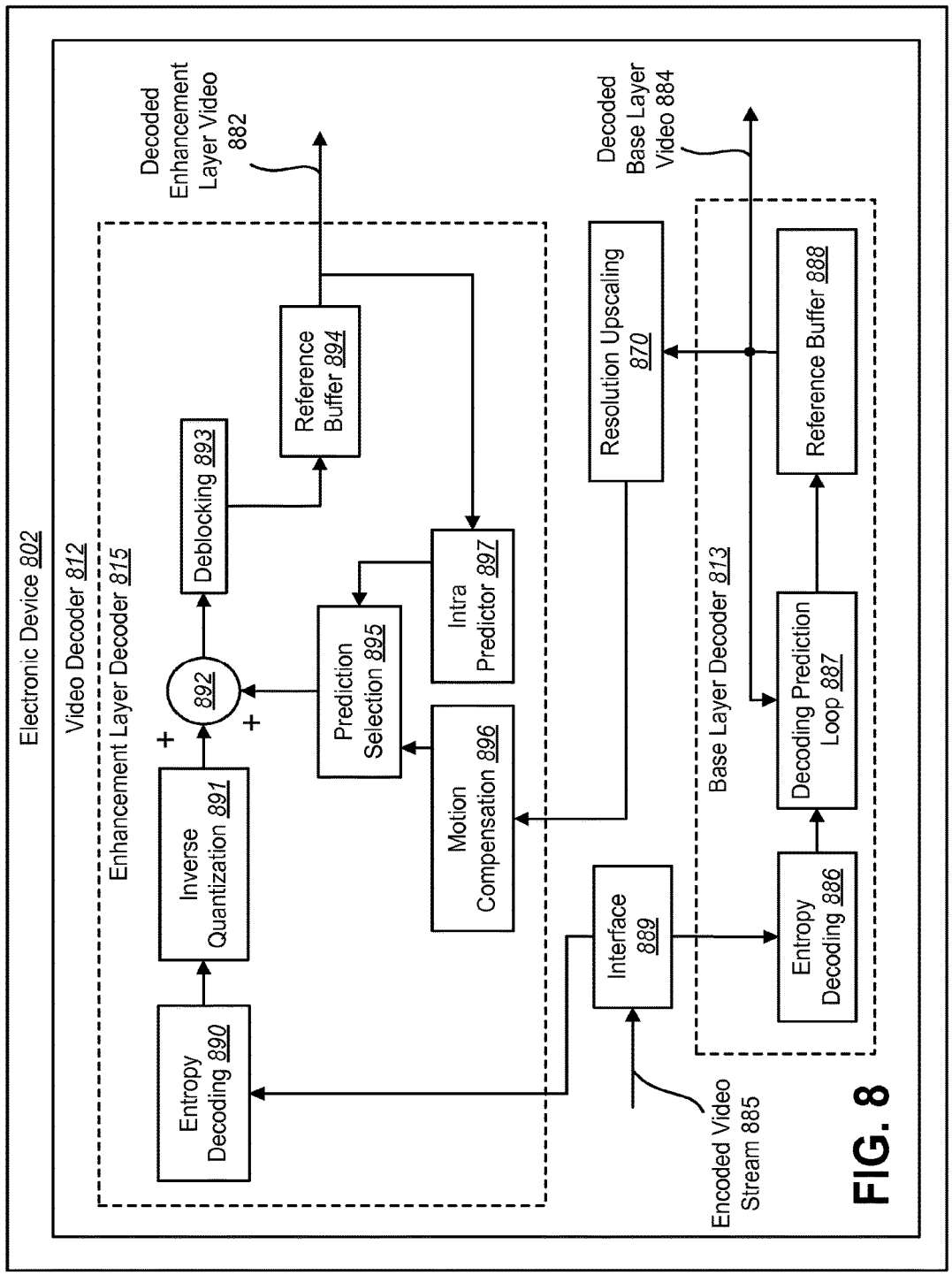
FIG. 8 is a block diagram illustrating one configuration of a decoder on an electronic device.

FIG. 8 is a block diagram illustrating one configuration of a video decoder 812 on an electronic device 802. The video decoder 812 of FIG. 8 may be one configuration of the video decoder 112 of FIG. 1. The video decoder 812 may include an enhancement layer decoder 815 and a base layer decoder 813. The video decoder 812 may also include an interface 889 and resolution upscaling 870.

The interface 889 may receive an encoded video stream 885. The encoded video stream 885 may include a base layer encoded video stream and an enhancement layer encoded video stream. The base layer encoded video stream and the enhancement layer encoded video stream may be sent separately or together. The interface 889 may provide some or all of the encoded video stream 885 to an entropy decoding block 886 in the base layer decoder 813. The output of the entropy decoding block 886 may be provided to a decoding prediction loop 887. The output of the decoding prediction loop 887 may be provided to a reference buffer 888. The reference buffer may provide feedback to the decoding prediction loop 887. The reference buffer 888 may also output the decoded base layer video 884.

The interface 889 may also provide some or all of the encoded video stream 885 to an entropy decoding block 890 in the enhancement layer decoder 815. The output of the entropy decoding block 890 may be provided to an inverse quantization block 891. The output of the inverse quantization block 891 may be provided to an adder 892. The adder 892 may add the output of the inverse quantization block 891 and the output of a prediction selection block 895. The output of the adder 892 may be provided to a deblocking block 893. The output of the deblocking block 893 may be provided to a reference buffer 894. The reference buffer 894 may output the decoded enhancement layer video 882.

The output of the reference buffer 894 may also be provided to an intra predictor 897. The enhancement layer decoder 815 may include motion compensation 896. The motion compensation 896 may be performed after the resolution upscaling 870. The prediction selection block 895 may receive the output of the intra predictor 897 and the output of the motion compensation 896.

Figure 9:
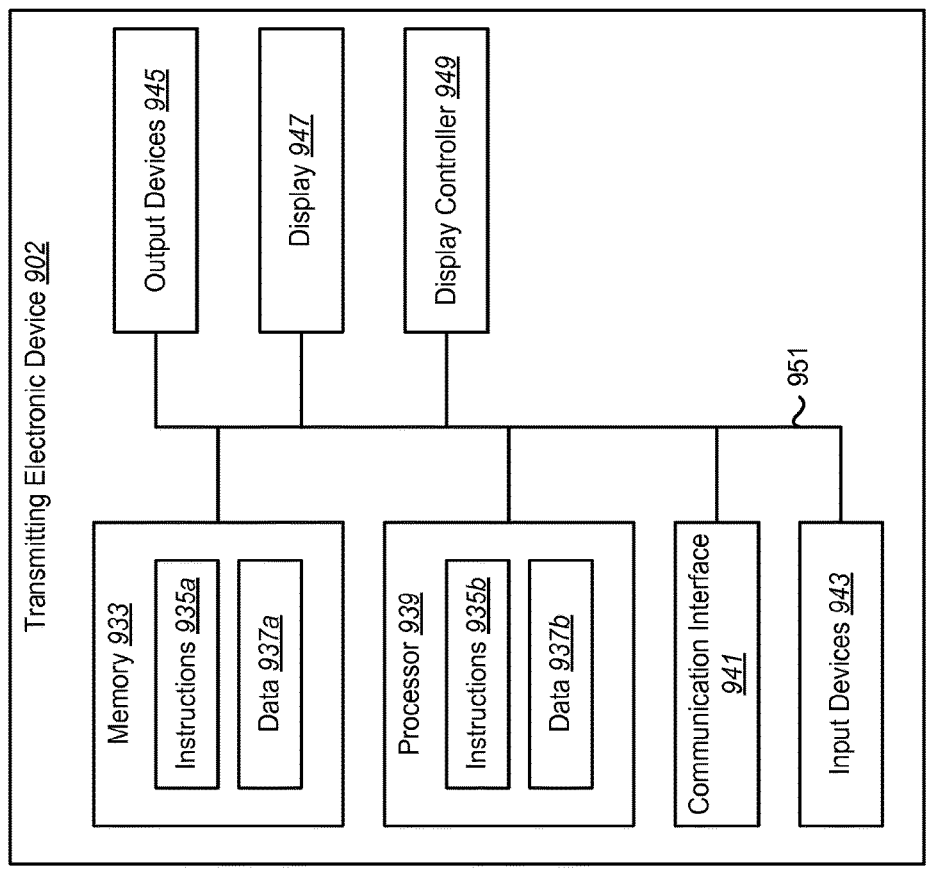
FIG. 9 illustrates various components that may be utilized in a transmitting electronic device.

FIG. 9 illustrates various components that may be utilized in a transmitting electronic device 902. One or more of the electronic devices 102 described herein may be implemented in accordance with the transmitting electronic device 902 illustrated in FIG. 9.

The transmitting electronic device 902 includes a processor 939 that controls operation of the transmitting electronic device 902. The processor 939 may also be referred to as a central processing unit (CPU). Memory 933, which may include both read-only memory (ROM), random access memory (RAM) or any type of device that may store information, provides instructions 935a (e.g., executable instructions) and data 937a to the processor 939. A portion of the memory 933 may also include non-volatile random access memory (NVRAM). The memory 933 may be in electronic communication with the processor 939.

Instructions 935b and data 937b may also reside in the processor 939. Instructions 935b and/or data 937b loaded into the processor 939 may also include instructions 935a and/or data 937a from memory 933 that were loaded for execution or processing by the processor 939. The instructions 935b may be executed by the processor 939 to implement one or more of the methods disclosed herein.

The transmitting electronic device 902 may include one or more communication interfaces 941 for communicating with other electronic devices (e.g., receiving electronic device). The communication interfaces 941 may be based on wired communication technology, wireless communication technology, or both. Examples of a communication interface 941 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, a wireless transceiver in accordance with 3rd Generation Partnership Project (3GPP) specifications and so forth.

The transmitting electronic device 902 may include one or more output devices 945 and one or more input devices 943. Examples of output devices 945 include a speaker, printer, etc. One type of output device that may be included in a transmitting electronic device 902 is a display device 947. Display devices 947 used with configurations disclosed herein may utilize any suitable image projection technology, such as a cathode ray tube (CRT), liquid crystal display (LCD), light-emitting diode (LED), gas plasma, electroluminescence or the like. A display controller 949 may be provided for converting data stored in the memory 933 into text, graphics, and/or moving images (as appropriate) shown on the display 947. Examples of input devices 943 include a keyboard, mouse, microphone, remote control device, button, joystick, trackball, touchpad, touchscreen, lightpen, etc.

The various components of the transmitting electronic device 902 are coupled together by a bus system 951, which may include a power bus, a control signal bus and a status signal bus, in addition to a data bus. However, for the sake of clarity, the various buses are illustrated in FIG. 9 as the bus system 951. The transmitting electronic device 902, illustrated in FIG. 9, is a functional block diagram rather than a listing of specific components.

Figure 10:
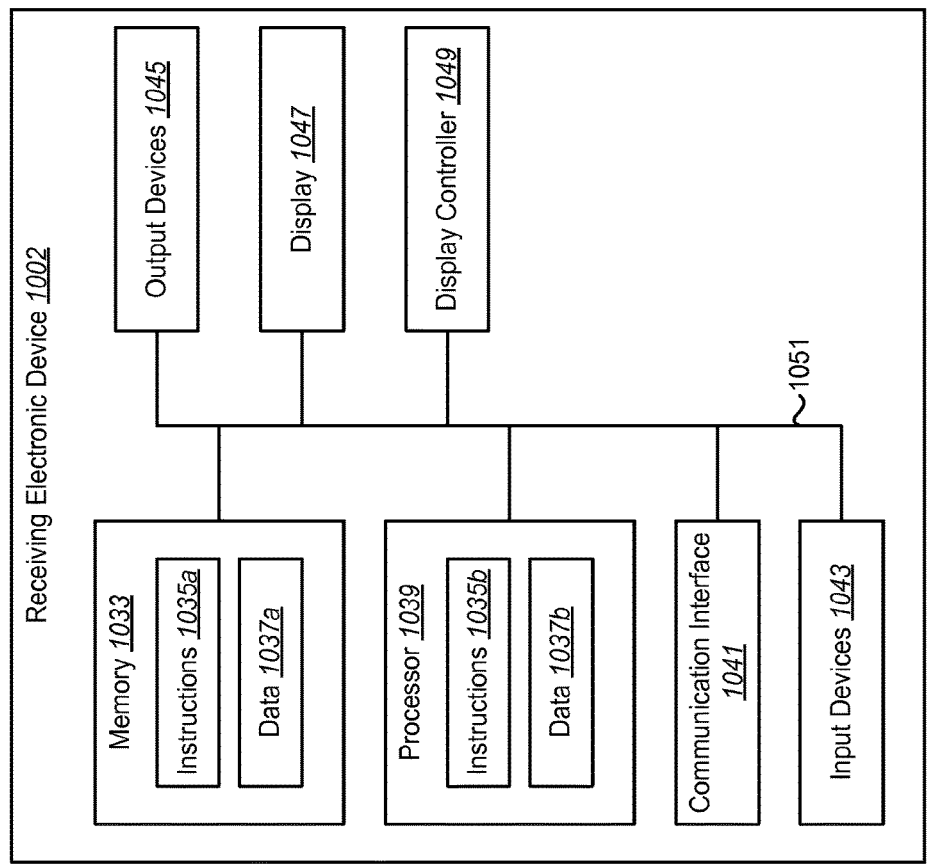
FIG. 10 is a block diagram illustrating various components that may be utilized in a receiving electronic device.

FIG. 10 is a block diagram illustrating various components that may be utilized in a receiving electronic device 1002. One or more of the electronic devices 102 may be implemented in accordance with the receiving electronic device 1002 illustrated in FIG. 10.

The receiving electronic device 1002 includes a processor 1039 that controls operation of the receiving electronic device 1002. The processor 1039 may also be referred to as a CPU. Memory 1033, which may include both ROM, RAM or any type of device that may store information, provides instructions 1035a (e.g., executable instructions) and data 1037a to the processor 1039. A portion of the memory 1033 may also include NVRAM. The memory 1033 may be in electronic communication with the processor 1039.

Instructions 1035b and data 1037b may also reside in the processor 1039. Instructions 1035b and/or data 1037b loaded into the processor 1039 may also include instructions 1035a and/or data 1037a from memory 1033 that were loaded for execution or processing by the processor 1039. The instructions 1035b may be executed by the processor 1039 to implement one or more of the methods 200, 300, 400, 500 disclosed herein.

The receiving electronic device 1002 may include one or more communication interfaces 1041 for communicating with other electronic devices (e.g., a transmitting electronic device). The communication interfaces 1041 may be based on wired communication technology, wireless communication technology, or both. Examples of a communication interface 1041 include a serial port, a parallel port, a USB, an Ethernet adapter, an IEEE 1394 bus interface, a SCSI bus interface, an IR communication port, a Bluetooth wireless communication adapter, a wireless transceiver in accordance with 3GPP specifications and so forth.

The receiving electronic device 1002 may include one or more output devices 1045 and one or more input devices 1043. Examples of output devices 1045 include a speaker, printer, etc. One type of output device that may be included in a receiving electronic device 1002 is a display device 1047. Display devices 1047 used with configurations disclosed herein may utilize any suitable image projection technology, such as a CRT, LCD, LED, gas plasma, electroluminescence or the like. A display controller 1049 may be provided for converting data stored in the memory 1033 into text, graphics, and/or moving images (as appropriate) shown on the display 1047. Examples of input devices 1043 include a keyboard, mouse, microphone, remote control device, button, joystick, trackball, touchpad, touchscreen, lightpen, etc.

The various components of the receiving electronic device 1002 are coupled together by a bus system 1051, which may include a power bus, a control signal bus and a status signal bus, in addition to a data bus. However, for the sake of clarity, the various buses are illustrated in FIG. 10 as the bus system 1051. The receiving electronic device 1002 illustrated in FIG. 10 is a functional block diagram rather than a listing of specific components.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods or approaches described herein may be implemented in and/or realized using a chipset, an ASIC, a LSI or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for video decoding using circuitry, comprising:
   receiving a maximum number of sub-layers for inter-layer prediction plus one associated with a reference picture layer, wherein the maximum number of sub-layers for inter-layer prediction plus one equal to zero indicates that non-random access point (non-RAP) pictures with a layer identifier equal to a layer identifier syntax element value are used as pictures for inter-layer prediction, and the maximum number of sub-layers for inter-layer prediction plus one greater than zero indicates that pictures with the layer identifier equal to the layer identifier syntax element value and with a temporal identifier greater than the maximum number of sub-layers for inter layer prediction are not used as references for inter-layer prediction; and
   determining whether a picture of a reference picture layer is marked as "used for long-term reference"; wherein the picture of the reference picture layer is marked as "used for long-term reference" in a case that the value of the maximum number of sub-layers for inter-layer prediction plus one is equal to zero and the picture of the reference picture layer is a random access point (RAP) picture.

2. An electronic device configured for video decoding, comprising:

a processor;

memory in electronic communication with the processor, wherein instructions stored in the memory are executable to:

receive a maximum number of sub-layers for inter-layer prediction plus one associated with a reference picture layer, wherein the maximum number of sub-layers for inter-layer prediction plus one equal to zero indicates that non-random access point (non-RAP) pictures with a layer identifier equal to a layer identifier syntax element value are used as pictures for interlayer prediction, and the maximum number of sub-layers for inter-layer prediction plus one greater than zero indicates that pictures with the layer identifier equal to the layer identifier syntax element value and with a temporal identifier greater than the maximum number of sub-layers for inter layer prediction are not used as references for inter-layer prediction; and determine whether a picture of a reference picture layer is marked as "used for long-term reference"; wherein the picture of the reference picture layer is marked as "used for long-term reference" in a case that the value of the maximum number of sub-layers for inter-layer prediction plus one is equal to zero and the picture of the reference picture layer is a random access point (RAP) picture.

\* \* \* \* \*